(12) United States Patent
Kwak et al.

(10) Patent No.: US 11,353,992 B2
(45) Date of Patent: Jun. 7, 2022

(54) METHOD AND DEVICE FOR PROCESSING USER INPUT ON BASIS OF TIME DURING WHICH USER INPUT IS MAINTAINED

(71) Applicant: Samsung Electronics Co., Ltd., Gyeonggi-do (KR)

(72) Inventors: Sanghun Kwak, Gyeonggi-do (KR); Mansung Kim, Gyeonggi-do (KR); Changjin Kim, Gyeonggi-do (KR); Jungwon Kim, Gyeonggi-do (KR); Jaehyun Baek, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/265,567

(22) PCT Filed: Aug. 9, 2019

(86) PCT No.: PCT/KR2019/010050
§ 371 (c)(1),
(2) Date: Feb. 3, 2021

(87) PCT Pub. No.: WO2020/032668
PCT Pub. Date: Feb. 13, 2020

(65) Prior Publication Data
US 2021/0303127 A1  Sep. 30, 2021

(30) Foreign Application Priority Data
Aug. 9, 2018 (KR) .......................... 10-2018-0092992

(51) Int. Cl.
*G06F 3/041* (2006.01)

(52) U.S. Cl.
CPC .............................. *G06F 3/04186* (2019.05)

(58) Field of Classification Search
CPC ............... G06F 3/04186; G06F 3/0446; G06F 3/0416; G06F 3/0488; G06F 3/0412;
(Continued)

(56) References Cited

U.S. PATENT DOCUMENTS 9,582,122 B2 * 2/2017 Bathiche ............... G06F 3/0488
9,785,272 B1 * 10/2017 Rosenberg ............ G06F 1/3262
2013/0176268 A1 * 7/2013 Li ......................... G06F 3/0446
345/174

(Continued)

FOREIGN PATENT DOCUMENTS

JP  2016-527606 A  9/2016
JP  2017-157086 A  9/2017

(Continued)

*Primary Examiner* — Ibrahim A Khan
(74) *Attorney, Agent, or Firm* — Cha & Reiter, LLC

(57) ABSTRACT

According to various embodiments of the present invention, an electronic device comprises a display panel including a touch sensor, and a processor, wherein the processor can be configured to: acquire a user input inputted in a designated area of the display panel through the touch sensor; identify a pattern corresponding to the form of the user input; perform a designated operation based on the user input when the pattern corresponds to a first designated condition; check the time during which the user input is maintained with respect to the designated area when the pattern corresponds to a second designated condition; determine the designated area as an ineffective input area on the basis of checking for whether the time corresponds to a designated time range; and ignore the user input inputted through the ineffective input area, or another input related to the user input. In addition to the various embodiments disclosed in the present invention, other various embodiments are possible.

14 Claims, 19 Drawing Sheets

(58) Field of Classification Search
CPC ............ G06F 2203/04104; G06F 2203/04105; G09G 2330/021
See application file for complete search history.

(56) References Cited

U.S. PATENT DOCUMENTS

| | | | | |
|---|---|---|---|---|
| 2013/0222286 A1* | 8/2013 | Kang | .................... | G06F 3/0416 345/173 |
| 2013/0222338 A1* | 8/2013 | Gim | ........................ | G06F 3/044 345/174 |
| 2013/0246861 A1* | 9/2013 | Colley | .................. | G06F 3/0418 714/48 |
| 2014/0122911 A1* | 5/2014 | Gunn | .................... | G06F 1/3265 713/323 |
| 2014/0125612 A1* | 5/2014 | Park | ...................... | G06F 3/0416 345/173 |
| 2014/0267064 A1* | 9/2014 | Lu | ........................ | H04M 1/724 345/173 |
| 2014/0372896 A1* | 12/2014 | Raman | ................. | G06F 3/0488 715/741 |
| 2015/0153893 A1* | 6/2015 | Park | ...................... | G06F 3/0488 345/173 |
| 2015/0277539 A1* | 10/2015 | Chueh | .................... | G09G 5/003 345/178 |
| 2016/0041683 A1 | 2/2016 | Ma et al. | | |
| 2016/0062556 A1* | 3/2016 | Chung | .................... | G06F 3/017 715/781 |
| 2016/0188181 A1* | 6/2016 | Smith | ................. | G06F 3/04886 715/765 |
| 2016/0253039 A1 | 9/2016 | Heo et al. | | |
| 2017/0322661 A1 | 11/2017 | Varje et al. | | |
| 2018/0335921 A1* | 11/2018 | Karunamuni | ....... | G06F 3/04817 |
| 2019/0079576 A1* | 3/2019 | Liu | ....................... | G06F 3/04166 |
| 2019/0102001 A1* | 4/2019 | O'Connor | ............... | G06F 3/044 |
| 2019/0179487 A1 | 6/2019 | Kong et al. | | |

FOREIGN PATENT DOCUMENTS

| | | |
|---|---|---|
| KR | 10-2015-0064354 A | 6/2015 |
| KR | 10-2016-0084625 A | 7/2016 |
| KR | 10-2016-0104494 A | 9/2016 |
| KR | 10-2018-0014625 A | 2/2018 |

* cited by examiner

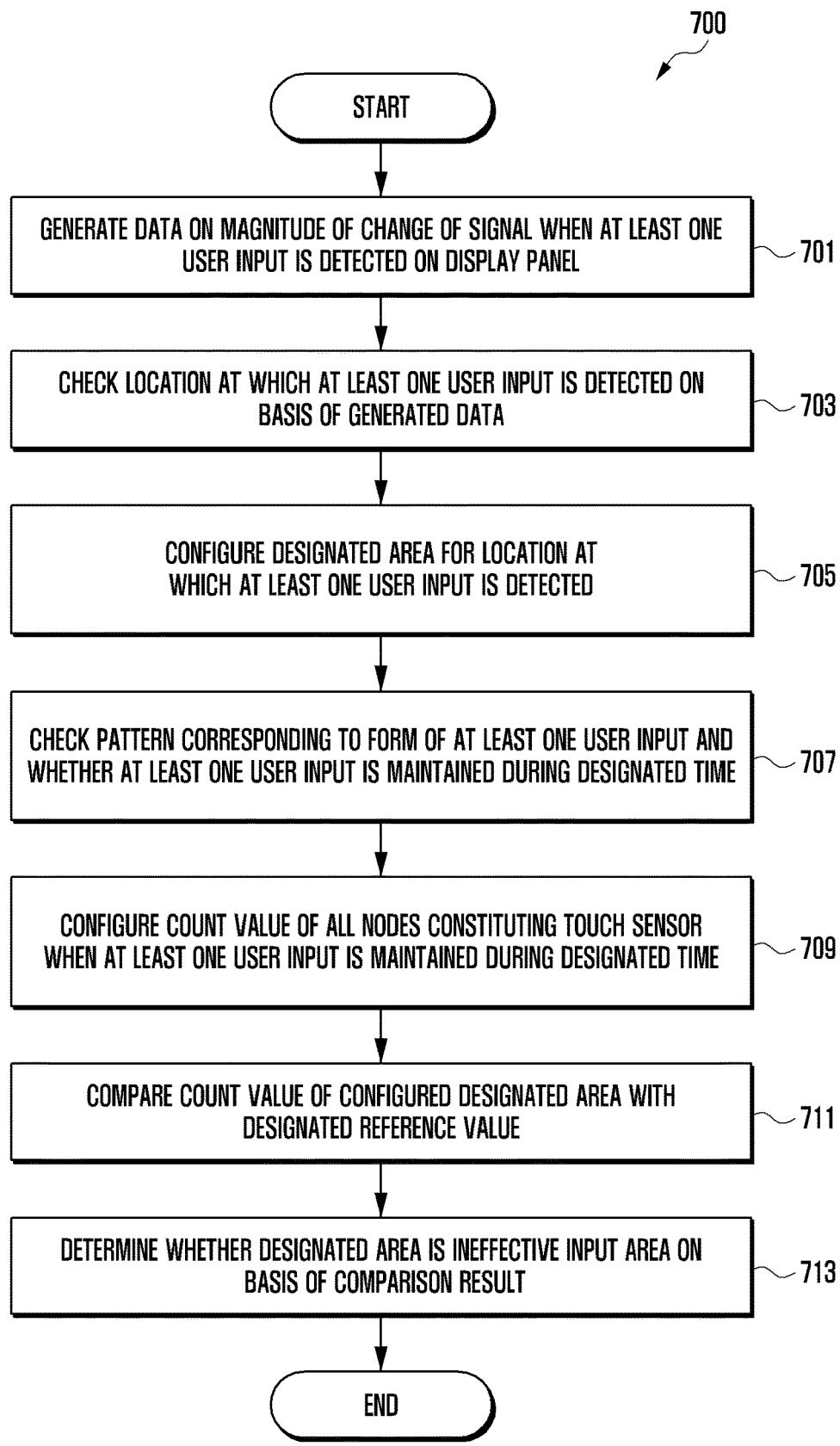

FIG. 8B

| | C01 | C02 | C03 | C04 | C05 | C06 | C07 | C08 | C09 | C10 |
|---|---|---|---|---|---|---|---|---|---|---|
| R01 | -5 | -1 | 2 | 1 | 0 | 0 | 4 | 3 | 1 | -3 |
| R02 | -10 | -6 | -3 | 5 | 12 | 18 | 9 | 1 | -4 | -5 |
| R03 | 1 | 2 | 12 | 14 | 33 | 37 | 17 | 10 | 2 | 1 |
| R04 | 2 | 6 | 11 | 31 | 144 | 215 | 52 | 12 | 6 | -1 |
| R05 | 2 | 5 | 12 | 54 | 428 | 574 | 141 | 12 | 6 | -1 |
| R06 | 3 | 6 | 10 | 48 | 366 | 491 | 103 | 20 | 5 | 0 |
| R07 | 4 | 2 | 11 | 14 | 49 | 59 | 14 | 9 | 0 | 0 |
| R08 | -3 | -2 | 0 | 3 | 12 | 17 | 2 | -2 | -7 | -7 |
| R09 | 0 | -1 | 3 | 0 | 3 | 5 | 0 | 0 | -4 | -4 |
| R10 | 0 | 0 | 0 | 0 | 0 | 0 | 0 | 0 | 0 | 0 |

FIG. 8C

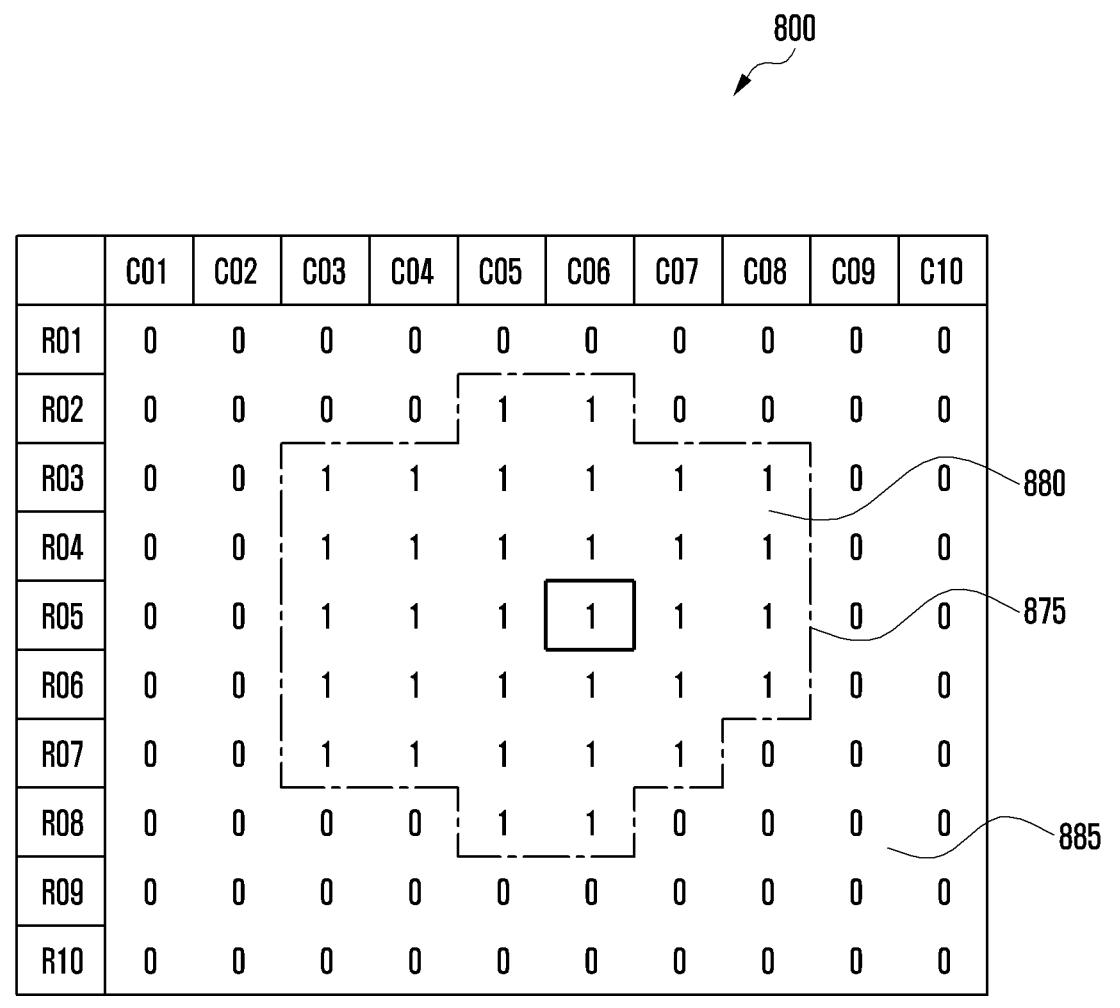

|     | C01 | C02 | C03 | C04 | C05 | C06 | C07 | C08 | C09 | C10 |
|-----|-----|-----|-----|-----|-----|-----|-----|-----|-----|-----|
| R01 | 0 | 0 | 0 | 0 | 0 | 0 | 0 | 0 | 0 | 0 |
| R02 | 0 | 0 | 0 | 0 | 1 | 1 | 0 | 0 | 0 | 0 |
| R03 | 0 | 0 | 1 | 1 | 1 | 1 | 1 | 1 | 0 | 0 |
| R04 | 0 | 0 | 1 | 1 | 1 | 1 | 1 | 1 | 0 | 0 |
| R05 | 0 | 0 | 1 | 1 | 1 | 1 | 1 | 1 | 0 | 0 |
| R06 | 0 | 0 | 1 | 1 | 1 | 1 | 1 | 1 | 0 | 0 |
| R07 | 0 | 0 | 1 | 1 | 1 | 1 | 1 | 0 | 0 | 0 |
| R08 | 0 | 0 | 0 | 0 | 1 | 1 | 0 | 0 | 0 | 0 |
| R09 | 0 | 0 | 0 | 0 | 0 | 0 | 0 | 0 | 0 | 0 |
| R10 | 0 | 0 | 0 | 0 | 0 | 0 | 0 | 0 | 0 | 0 |

|     | C01 | C02 | C03 | C04 | C05 | C06 | C07 | C08 | C09 | C10 | C11 | C12 | C13 | C14 | C15 | C16 |
|-----|-----|-----|-----|-----|-----|-----|-----|-----|-----|-----|-----|-----|-----|-----|-----|-----|
| R01 | 260 | 215 | 66  | 14  | 3   |     |     |     |     | 1   | 1   | 4   | 7   | 6   | 6   | 2   |
| R02 | 186 | 537 | 327 | 62  | 17  |     |     |     |     | 4   | 6   | 9   | 6   | 7   | 9   | 6   |
| R03 | 60  | 284 | 560 | 211 | 28  |     |     | -15 | -11 | 3   | 4   | 7   | 5   | 3   | 4   | 1   |
| R04 | 24  | 87  | 464 | 446 | 159 |     |     | -20 | -9  | 0   | 2   | 4   | 2   | 3   | 3   | -1  |
| R05 | 11  | 20  | 196 | 583 | 554 |     |     | -17 | -9  | -1  | 0   | 3   | 1   | 1   | 2   | 1   |
| R06 | -2  | -3  | 29  | 252 | 593 | 188 | 12  | -18 | -5  | 4   | 0   | 0   | -2  | -3  | 0   | 0   |
| R07 | -2  | -15 | -9  | 40  | 320 | 470 | 68  | -21 | 25  | 16  | 2   | 3   | -3  | 1   | 0   | 2   |
| R08 | 3   | -20 | -29 | -9  | 60  | 426 | 438 | 150 | 179 | 28  | 20  | 13  | 7   | 4   | 1   | 3   |
| R09 | 5   | -20 | -32 | -24 | -3  | 69  | 646 | 574 | 458 | 62  | 15  | 13  | 12  | 11  | 10  | 9   |
| R10 | 2   | -10 | -14 | -5  | -3  | 15  | 361 | 602 | 249 | 55  | 16  | 13  | 12  | 10  | 5   | 4   |
| R11 | -20 | -20 | -23 | -17 | -16 | -8  | 43  | 174 | 27  | 16  | 15  | 14  | 11  | 5   | -1  | -5  |
| R12 | -6  | -13 | -15 | -13 | -15 | -9  | 7   | 13  | 12  | 15  | 14  | 13  | 11  | 12  | 6   | 0   |
| R13 | -6  | -12 | -8  | -14 | -11 | -10 | -6  | 3   | 2   | 11  | 18  | 16  | 15  | 17  | 11  | 4   |
| R14 | 0   | 0   | 0   | 0   | 0   | 0   | -9  | -4  | 0   | 0   | 0   | 0   | 0   | 0   | 0   | 0   |

METHOD AND DEVICE FOR PROCESSING USER INPUT ON BASIS OF TIME DURING WHICH USER INPUT IS MAINTAINED

CROSS REFERENCE TO RELATED APPLICATIONS

This application is a National Phase Entry of PCT International Application No. PCT/KR2019/010050, which was filed on Aug. 9, 2019, and claims a priority to Korean Patent Application No. 10-2018-0092992, which was filed on Aug. 9, 2018, the contents of which are incorporated herein by reference.

TECHNICAL FIELD

Various embodiments of the disclosure relate to an electronic device and a method for processing user input based on the time during which user input is maintained using the same.

BACKGROUND ART

Various electronic devices (for example, smartphones and tablet PCs) may provide users with various kinds of contents through displays. Users prefer electronic devices having large-screen displays such that various kinds of contents can be watched more easily. Electronic devices having large-screen displays have poor portability but can provide users with highly-readable contents. Users can control contents displayed through large-screen displays by using an object (for example, a finger or a stylus pen).

DISCLOSURE OF INVENTION

Technical Problem

When a use holds an electronic device having a large-screen display, fingers used to hold the same may come into contact with the edge area of the display, and touch inputs unintended by the user may be recognized. In addition, when making a touch through an object (for example, a finger or a stylus pen) on the large-screen display, the user's palm or the like may contact the display, thereby making it impossible to accurately recognize touch inputs made by the object.

An electronic device according to various embodiments of the disclosure may configure at least a partial area of the display thereof as an ineffective input area in view of the pattern of an touch input and/or the time for which the same is maintained such that inputs unintended by the user (for example, touch inputs resulting from holding or by the palm) are not recognized.

An electronic device according to various embodiments of the disclosure may configure at least a partial area of the display thereof as an ineffective input area such that, when multiple touch inputs are recognized, no input is recognized due to a noise phenomenon resulting from recognition of multiple touch inputs.

Solution to Problem

An electronic device according to various embodiments of the disclosure may include: a display panel including a touch sensor; and a processor. The processor may be configured to: acquire a user input made in a designated area of the display panel through the touch sensor; identify a pattern corresponding to a form of the user input; perform a designated operation based on the user input when the pattern corresponds to a first designated condition; and check the time during which the user input is maintained with respect to the designated area when the pattern corresponds to a second designated condition, determine the designated area to be an ineffective input area, based at least on checking whether the time corresponds to a designated time range, and ignore user input made through the ineffective input area or another input related to the user input.

An electronic device according to various embodiments of the disclosure may include: a display panel including a touch sensor; and a processor. The processor may be configured to: acquire a user input made in a designated area of the display panel through the touch sensor; check a time during which the user input in the designated area is maintained; determine the designated area to be an effective input area, and perform a designated operation based on the user input made through the effective input area, when the time included within a first designated time range; and determine the designated area to be an ineffective input area, and ignore the user input made through the ineffective input area or other input related to the user input, when the time included within a second designated time range.

A method for processing a user input of an electronic device according to various embodiments of the disclosure may include the operations of: acquiring a user input made in a designated area of the display panel through the touch sensor; identifying a pattern corresponding to a form of the user input; performing a designated operation based on the user input when the pattern corresponds to a designated condition; and if the pattern corresponds to a second designated condition, checking a time during which the user input in the designated area is maintained, determining the designated area to be an ineffective input area based at least on confirmation that the time corresponds to a designated time range, and ignoring the user input made through the ineffective input area or other input related to the user input.

A method for processing a user input of an electronic device according to various embodiments of the disclosure may include the operations of: acquiring a user input made in a designated area of the display panel through a touch sensor; checking a time during which the user input in the designated area is maintained; determining the designated area to be an effective input area and performing a designated operation based on the user input made through the effective input area when the time included within a first designated time range; and determining the designated area to be an ineffective input area, and ignoring the user input made through the ineffective input area or other input related to the user input, when the time included within a second designated time range.

Advantageous Effects of Invention

An electronic device according to various embodiments of the disclosure may configure at least a partial area of the display thereof as an ineffective input area in view of the pattern of a touch input or the time for which the same is maintained. For example, the electronic device may configure at least a partial area of the display as an ineffective input area, when unintended touch inputs resulting from holding or the palm are likely to occur, such that touch inputs intended by the user can be accurately recognized and processed.

An electronic device according to various embodiments of the disclosure may configure at least a partial area of the display thereof, in which a high degree of noise interference may occur due to multiple touch inputs, as an ineffective input area. Accordingly, inputs (for example, ghost touches) resulting from noise interference are not recognized by the electronic device.

BRIEF DESCRIPTION OF DRAWINGS

FIG. 7 is a flowchart illustrating a method of processing at least one user input detected on a display panel, according to various embodiments;

FIGS. 8A to 8C are diagrams illustrating a method of processing a single user input detected on a display panel according to various embodiments;

FIGS. 10A and 10B are diagrams illustrating a method of processing a plurality of user inputs detected on a display panel, according to various embodiments;

FIGS. 11A and 11B are diagrams illustrating a method of processing a plurality of user inputs detected on a display panel, according to various embodiments;

FIGS. 12A and 12B are diagrams illustrating a method of processing new user input when a new user input is detected in a state in which an ineffective input area is determined, according to various embodiments;

MODE FOR THE INVENTION

Figure 1:
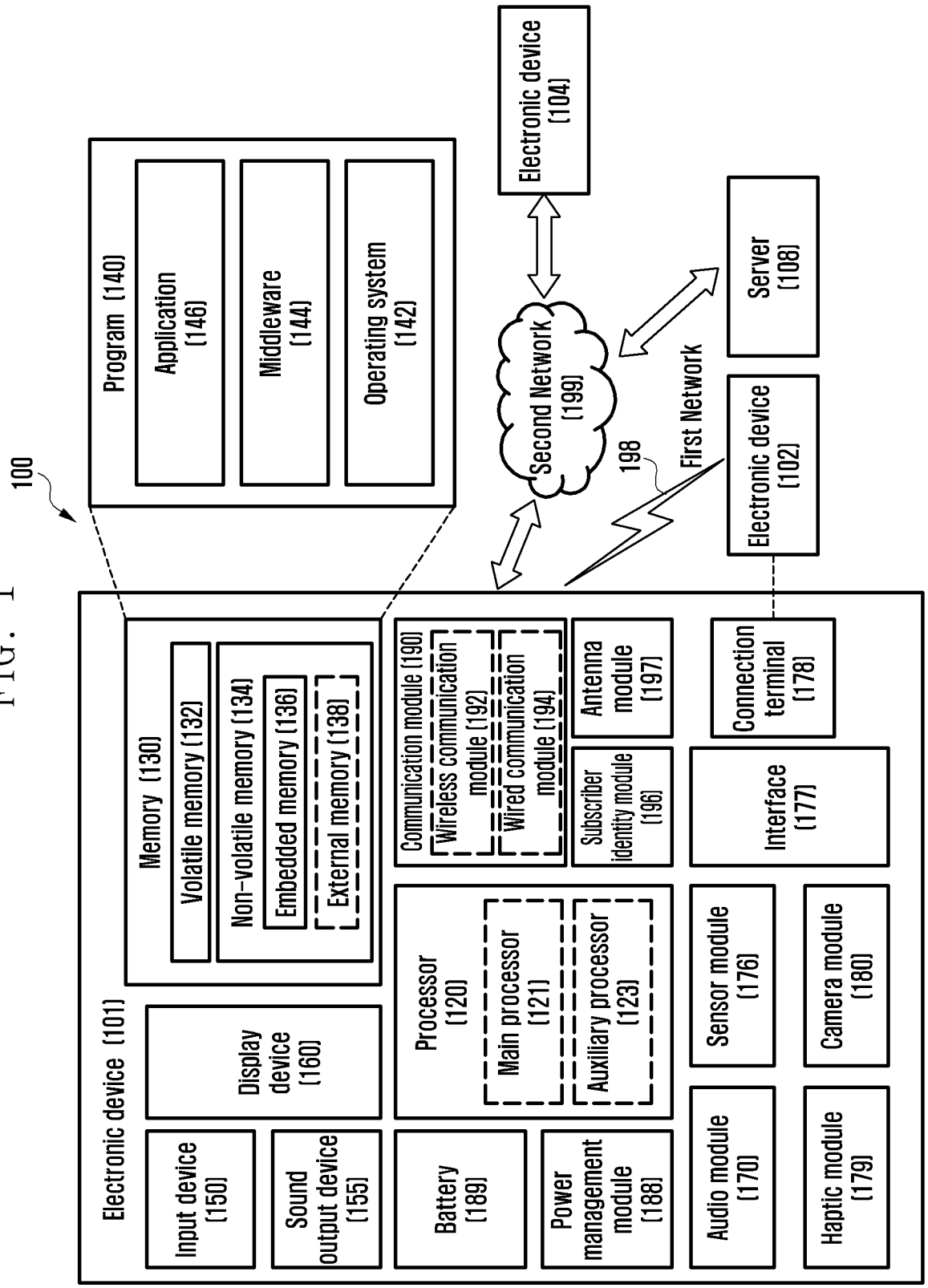
FIG. 1 is a block diagram illustrating an electronic device in a network environment, which processes user input, based on the time during which the user input is maintained according to various embodiment.

FIG. 1 is a block diagram illustrating an electronic device in a network environment, which processes user input, based on the time during which the user input is maintained according to various embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed in a conductor or a conductive pattern. According to an embodiment, the antenna module 197 may further include other components (e.g., a radio frequency integrated circuit (RFIC)) in addition to the conductor or the conductive pattern. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
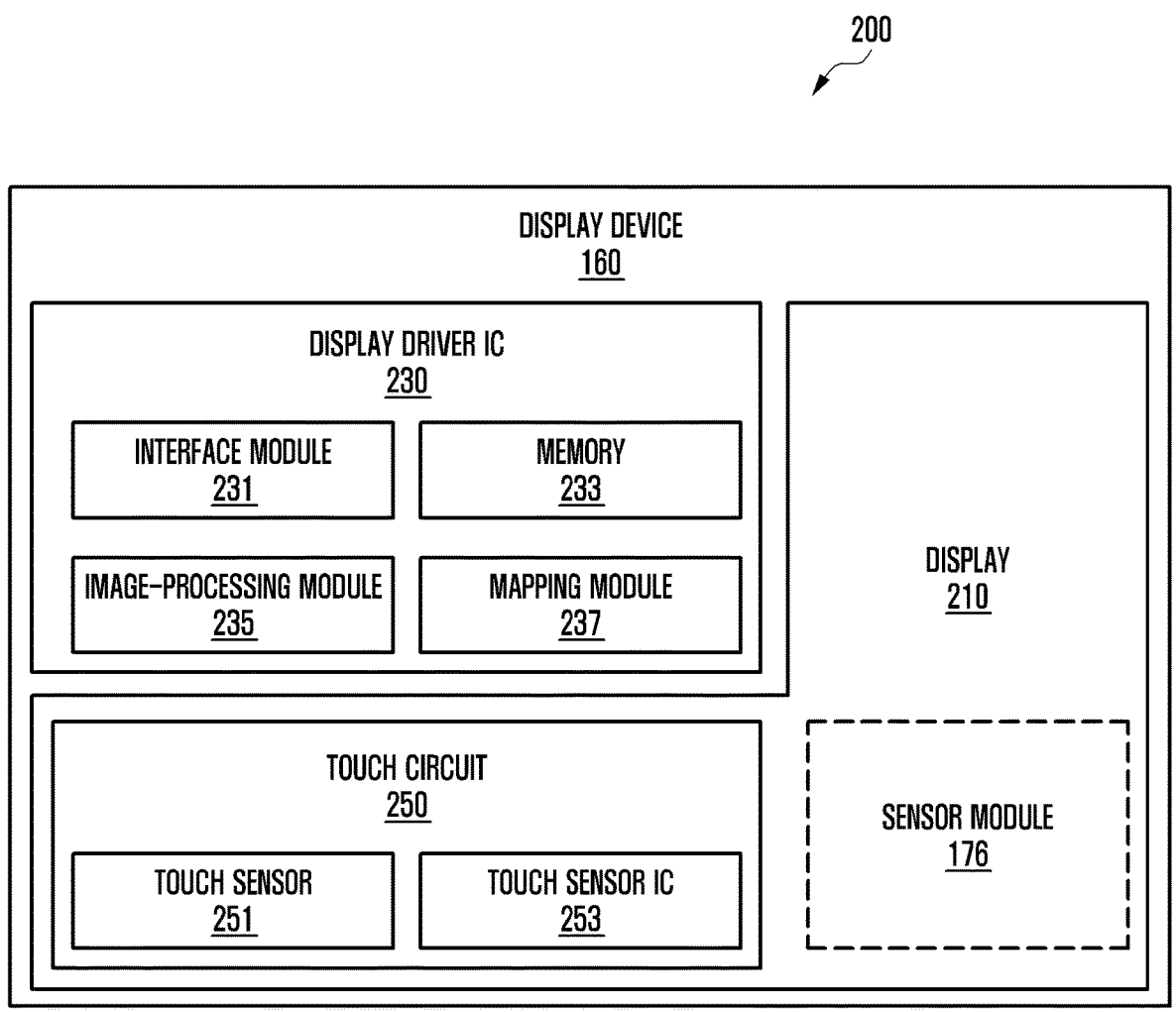
FIG. 2 is a block diagram of a display device that processes user input based on the time during which the user input is maintained according to various embodiments.

FIG. 2 is a block diagram 200 illustrating the display device 160 that processes user input based on the time during which the user input is maintained according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to detect a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
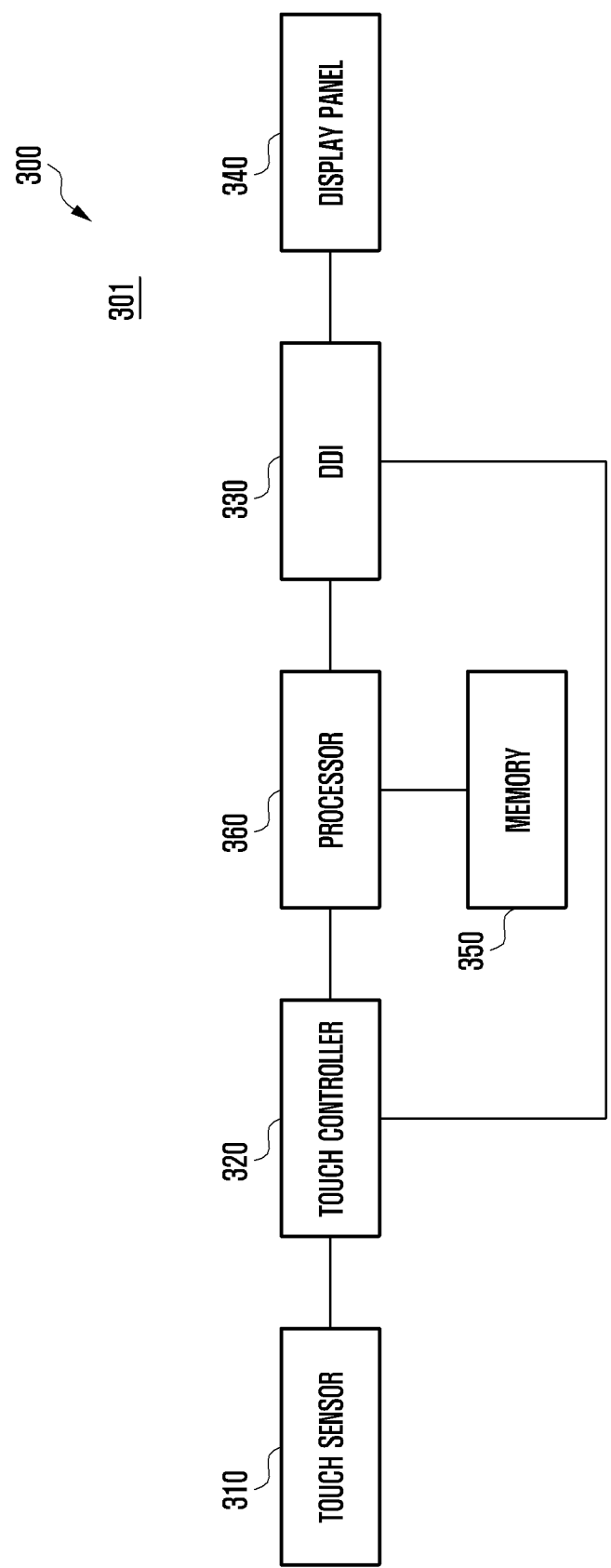
FIG. 3 is a block diagram illustrating an electronic device that processes user input based on the time during which the user input is maintained according to various embodiments.

FIG. 3 is a block diagram 300 illustrating an electronic device 301 that processes user input based on the time during which the user input is maintained according to various embodiments.

Referring to FIG. 3, the electronic device 301 (e.g., the electronic device 101 of FIG. 1) may include a touch sensor 310 (e.g., touch sensor 251 of FIG. 2), a touch controller 320, a display driver IC (DDI) 330 (e.g., the display driver IC (DDI) 230 of FIG. 2), a display panel 340, a memory 350 (e.g., the memory 130 of FIG. 1), and a processor 360 (e.g., the processor 120 of FIG. 1).

In an embodiment, the touch sensor 310 may include a capacitive sensor that senses (detects) user input. In an embodiment, the touch sensor 310 may be driven in a manner of detecting user input using self-capacitance generated between a contact object (e.g., a finger) and a sensing electrode according to a driving method, or in a manner of applying a designated driving signal and sensing user input using the mutual capacitance generated between a plurality of sensing electrodes by a contact object.

In an embodiment, when the touch sensor 310 is driven in the self-capacitance manner, a column and a row operate independently in the form of X, Y grids, and a change in the capacitance of the electrode can be detected using one electrode for each pixel forming the basis for user input recognition. In an embodiment, the touch sensor 310 may include a plurality of sensor nodes formed on the electrode.

In an embodiment, when the touch sensor 310 is driven in a mutual-capacitance manner, one electrode is arranged on the horizontal axis (e.g., arranged in a row direction) and the other electrode is arranged on the vertical axis (e.g., arranged in a column direction) to form a grid structure, using the capacitance between two electrodes. Thereafter, the capacitance change at a specific point can be detected by sequentially measuring the capacitance formed at the intersection between the two axes. In an embodiment, the touch sensor 310 may include a plurality of sensor nodes formed at intersections between the two axes. Changes in physical quantities (e.g., voltage, amount of light, resistance, amount of charge, capacitance, etc.) designated by a user input, for example, a touch, can be detected.

In an embodiment, the touch sensor 310 may be disposed to overlap the display panel 340.

In an embodiment, the touch controller 320 may be electrically connected to the touch sensor 310, detect a change in a physical quantity in the touch sensor 310, and calculate the user input, for example, data on a touch (e.g., coordinate data (X, Y) of the location where the touch was made), based on the change in the physical quantities (e.g., voltage, amount of light, resistance, amount of charge, capacitance, etc.). The touch controller 320 may transmit data on the touch to the processor 360. The processor 360 may acquire data on the touch as an event related to a user input.

In an embodiment, the display driver IC (DDI) 330 may be electrically connected to the display panel 340 and may supply an image signal corresponding to the image data received from the processor 360 to the display panel 340.

In an embodiment, the DDI 330 may supply an image signal to the display panel 340 at a designated frame rate (e.g., 60 frames per second) in an active state (or a wake-up state). However, this is not limiting, and the frame rate may be variable. In the active state, the processor 360 may provide image data corresponding to the image signal to the DDI 330 at a relatively high or low frequency compared to the case of operating in an inactive state (or a sleep state, a low-power state, the state in which the luminance of the touch screen display 410 is driven below a designated luminance (e.g., the state in which the touch screen display 410 is off, or in an always-on display (AOD) state), etc.).

In an embodiment, in the inactive state (or sleep state), the DDI 330 may supply the corresponding video signal to the display panel 340 at a relatively low or high frame rate compared to the case of operating in the activated state (or the wake-up state), based on the image data stored in the built-in graphics RAM. The processor 360 may temporarily operate in an activated state (or a wake-up state) to provide the image data to the DDI 330. The processor 360 may operate in an inactive state (or a sleep state), and might not itself be involved in the operation of the DDI 330.

In an embodiment, the DDI 330 may receive a user input acquired by the touch controller 320 through the processor 360. Alternatively, the DDI 330 may receive a user input acquired by the touch controller 320 from the touch controller 320.

In an embodiment, the touch controller 320 may obtain a user input when the DDI 330 is in an inactive state (or a sleep state, a low-power state) or an active state (or a wake-up state). The touch controller 320 may check (e.g., identify) a pattern corresponding to the form of the acquired user input and determine whether the checked pattern corresponds to a first designated condition or a second designated condition. For example, the touch controller 320 may check whether a user input is detected in the edge area of the display panel 340, whether the distance between the position on which the user input on the display panel 340 is detected and the outer periphery of the display panel 340 is within a designated range, and whether the size of the pattern corresponding to the form of the user input is less than or equal to the designated size, and determine whether the checked pattern corresponds to a first designated condition or a second designated condition based on the same.

In an embodiment, if the checked pattern corresponds to the first designated condition, the touch controller 320 may transmit data on the inputted user input to the processor 360.

In an embodiment, if the checked pattern corresponds to the second designated condition, the touch controller 320 may check the time during which the user input in the designated area is maintained. As a result of identification, if the sustained time included within a designated time range, the touch controller 320 may determine the designated area to be an ineffective input area. The touch controller 320 may ignore a user input made through the ineffective input area or other input related thereto. For example, the touch controller 320 might not transmit the data on the detected user input to the processor 360.

In an embodiment, the touch controller 320 may check the time during which a user input acquired for a designated area is maintained, and determine whether the time included within a first designated time range. When the time included within the first designated time range, the touch controller 320 may determine the designated area to be an effective input area and transmit data on a user input made through the effective input area to the processor 360.

In an embodiment, if the sustained time included within the first designated time range, the touch controller 320 may further perform an operation of determining whether a pattern corresponding to the form of the user input corresponds to a first designated condition or a second designated condition. When the pattern corresponding to the form of the user input corresponds to a first designated condition, the touch controller 320 may determine the designated area to be an effective input area.

In an embodiment, if the pattern corresponding to the form of the user input corresponds to the second designated condition, the touch controller 320 may determine the designated area to which the user input is made to be an ineffective input area, and ignore the user input or other user input related thereto.

In an embodiment, when the time included within the second designated time range, the touch controller 320 may determine the designated area to be an ineffective input area, and may ignore the user input made through the ineffective input area and other input related to the user input.

In an embodiment, the display panel 340 may receive an image signal supplied from the display-driving circuit (DDI) 330. The display panel 340 may display various contents (e.g., text, images, videos, icons, widgets, symbols, etc.), based on the image signal. The display panel 340 may include a touch sensor 310 and/or a digitizer panel (not shown) for recognizing a digital pen. In an embodiment, the display panel 340 and the touch sensor 310 may be integrally configured.

In an embodiment, the memory 350 may store commands or data related to the operation of components included in the electronic device 301. For example, the memory 350 may store an application for outputting text, an image, a GUI object, etc. in an inactive state (e.g., a sleep state).

In an embodiment, the processor 360 is electrically connected to the components 310-350 included in the electronic device 301 to control the components 310-350 included in the electronic device 301 and/or perform an operation or data processing related to communication.

In an embodiment, the processor 360 may be activated in response to user input received from the touch controller 320 in an inactive state (or a sleep state). The processor 360 may perform an operation designated in the received user input (e.g., execute an application according to selection of a GUI object (e.g., icon) displayed on the display panel 340).

In an embodiment, the processor 360 may perform at least some operations performed by the above-described touch controller 320. In an embodiment, the processor 360 may include at least one of an application processor (AP), a communication processor (CP), a sensor hub processor, a DDI 330, or a touch screen panel circuit.

Figure 4:
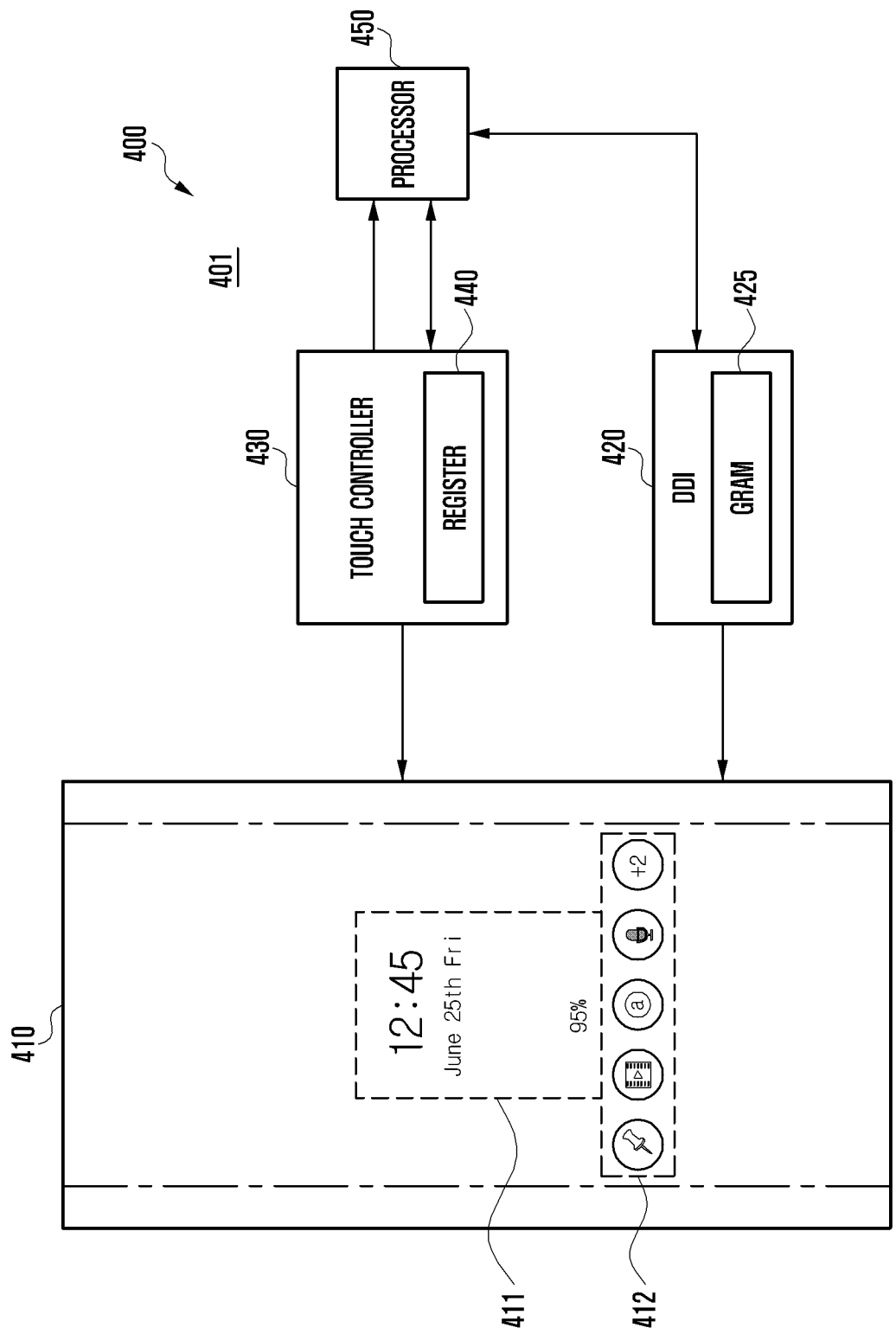
FIG. 4 is a block diagram illustrating an electronic device for describing a method of recognizing user input according to various embodiments.

FIG. 4 is a block diagram 400 illustrating an electronic device 401 for describing a method of recognizing user input according to various embodiments.

Referring to FIG. 4, the electronic device 401 (e.g., electronic device 301) may include a touch screen display 410, a display driver IC (DDI) 420 (e.g., the display driver IC 330 of FIG. 3), a touch controller 430 (e.g., the touch controller 320 of FIG. 3) including a register 440, and a processor 450 (e.g., the processor 360 of FIG. 3).

In an embodiment, the electronic device 401 may correspond to the electronic devices 101 and 301 illustrated in FIGS. 1 and 3, and duplicate descriptions with respect to FIGS. 1 and 3 may be omitted.

In an embodiment, the touch screen display 410 may include a display panel (e.g., the display panel 340 of FIG. 3) and a touch sensor (e.g., the touch sensor 310 of FIG. 3).

In an embodiment, the electronic device 401 may support an active state (or a wake-up state), in which a user can use the functions of the electronic device 401 intensively, and an inactive state (or a sleep state, a low-power state, a state in which the luminance of the touch screen display 410 is driven below a designated luminance (e.g., a state in which the touch screen display 410 is off or in an AOD state), etc.), which is a state of waiting for use by a user. In the inactive state (or sleep state), various hardware modules and/or software modules included in the electronic device 401 may be deactivated or may be supplied with a minimum amount of power so as to perform only designated limited functions. For example, when operating in an inactive state, the electronic device 401 may output information (e.g., text or an image) showing a digital clock, the date, and battery status to the first area 411 of the touch screen display 410. In addition, the electronic device 401 may output various types of GUI objects (e.g., icons) on the second area 412 of the touch screen display 410. For example, the processor 450 may provide image data of the content (e.g., text, images, GUI objects, etc.) displayed on at least some areas of the touch screen display 410 (e.g., the first area 411 and the second area 412) to a graphic RAM (GRAM) 425 included in the display-driving circuit 420. The processor 450 may temporarily operate in an activated state (or a wake-up state) to provide the image data to the graphic RAM 425. After providing the image data to the display-driving circuit 420, the processor 450 may be converted to an inactive state (or a sleep state).

In an embodiment, the processor 450 may periodically or aperiodically provide the image data to the graphic RAM (GRAM) 425. For example, the processor 450 may periodically provide newly generated image data (e.g., a digital clock image) to the graphic RAM (GRAM) 425. In another example, when a notification occurs, the processor 450 may non-periodically provide image data indicating the notification (e.g., an icon image of an IM application) to the graphic RAM 425.

In an embodiment, the processor 450 may interact with the touch controller 430. The processor 450 may write data on at least a portion of the touch screen display 410 in which a user input is detected in the register 440 included in the touch controller 430 when the display-driving circuit 420 is in an active state (or a wake-up state) or an inactive state (or a sleep state). The processor 450 may temporarily operate in an active state (or wake-up state) to write data on at least a portion of the touch screen display 410 to the register 440 in the inactive state (or sleep state). The processor 450 may be converted to an inactive state (e.g., a sleep state) after writing data on at least a portion of the area to the register 440. The processor 450 may periodically or aperiodically write data on at least a partial area, detected as ineffective for performing user input, into the register 440.

In an embodiment, the touch controller 430 may acquire a user input made in a designated area of the touch screen display 410. The touch controller 430 may check the pattern corresponding to the form of the acquired user input, determine a designated area to be an effective input area when the pattern corresponds to the first designated condition, and transmit data on the user input to the processor 450. The touch controller 430 may check a pattern corresponding to the form of the acquired user input, and when the pattern corresponds to a second designated condition, check the duration of the user input for the designated area. When the time corresponds to a designated time range, the touch controller 430 may determine the designated area to be an ineffective input area.

In an embodiment, the touch controller 430 may periodically or aperiodically write the data on the ineffective input area or the effective input area to the register 440 when the designated area is determined to be an ineffective input area or an effective input area. When the area in which the user input is detected is determined to be an ineffective input area, the touch controller 430 may write data on the ineffective user input to the register 440 based on the data on the ineffective input area written to the register 440. The touch controller 430 may ignore a user input made through the ineffective input area or other input related to the user input. When the area in which the user input is detected is determined to be an effective input area, the touch controller 430 may write data related to the effective user input (e.g., coordinate data of the location where an effective user input is made) into the register 440 and provide an interrupt to the processor 450 based on the data for the pattern of effective user input written to the register 440. The processor 450 may read data related to the effective user input from the register 440 in response to an interrupt from the touch controller 430. In an embodiment, the processor 450 may check a GUI object in which the user input has been made based on data on the effective user input and perform a function corresponding thereto.

In an embodiment, the touch controller 430 may recognize various types of effective user input according to the setting of the register 440. For example, the processor 450 may store data designating the type of ineffective user input, for example, data on a pattern corresponding to the form of the user input corresponds to the second designated condition, in the user input configuration data of the register 440. When the user input is recognized, the touch controller 430 may determine whether ineffective user input is detected by referring to data on the pattern written in the register 440.

Figure 5:
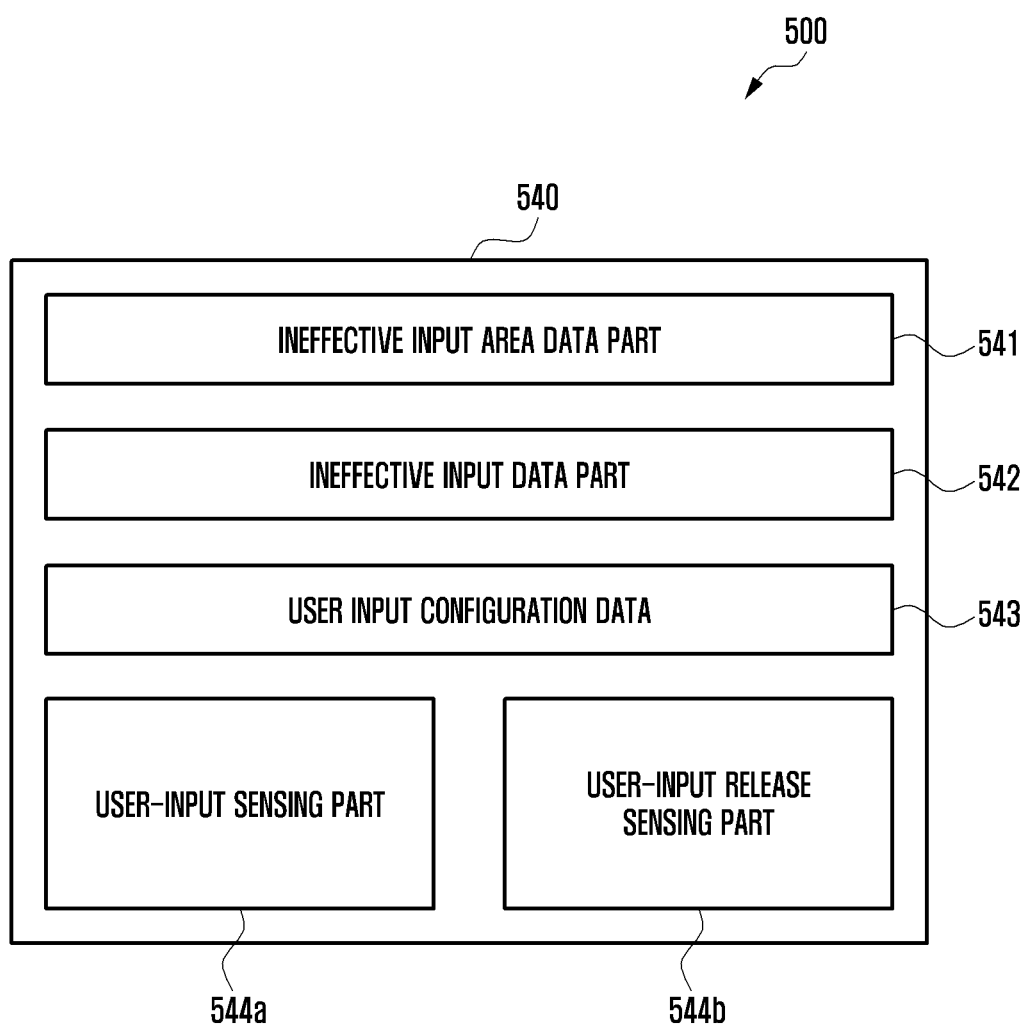
FIG. 5 is a block diagram illustrating a register included in a touch controller according to various embodiments.

FIG. 5 is a block diagram 500 illustrating a register included in a touch controller according to various embodiments.

Referring to FIG. 5, the register 540 may correspond to, for example, the register 440 of FIG. 4. For example, the register 540 may be implemented as volatile memory (e.g., the volatile memory 132 of FIG. 1), nonvolatile memory (e.g., the nonvolatile memory 134 of FIG. 1), or a combination thereof.

In an embodiment, the register 540 may provide a storage space in which certain data (e.g., digital values) can be written or read by a processor (e.g., the processor 450 of FIG. 4) or a touch controller (e.g., the touch controller 430 of FIG. 4).

In an embodiment, the ineffective input area data unit 541 may write data in the designated ineffective input area for detection the ineffective input by the processor. For example, the processor may include, as data relating to the ineffective input area, coordinate data (Xoffset, Yoffset) about a point on a perimeter surrounding the ineffective input area, width data W of the ineffective input area, and height data H of the ineffective input area.

In an embodiment, data regarding ineffective user input may be written in the ineffective input data unit 542 by the touch controller. Data related to ineffective user input written in the ineffective input data unit 542 may be read by a processor (e.g., the processor 450 of FIG. 4). For example, the data on the ineffective user input may include coordinate data (Xt, Yt) of the location where the ineffective user input is made.

In an embodiment, data specifying a pattern of ineffective user input may be written in the user input configuration data 543 by a processor. For example, the pattern of the ineffective user input may include at least one of a direction and a position in which the user input is detected, the speed of the user input, the moving state of the user input, or the size of the user input.

In an embodiment, data representing detection of a user input (e.g., a digital value) and data representing release of a user input (e.g., digital value) may be written in the user input detection unit 544a and the user input release unit 544b by the touch controller. For example, the touch controller may detect at least one user input for an effective user input pattern (e.g., double touch, long press), recognize at least one user input, and write the same in the user input detection unit 544a and the user input release unit 544b of the register 540. The processor may read the user input detection unit 544a and the user input release unit 544b, detect a user input and/or determine release of the user input based on the read result, and perform a designated function on the GUI object selected by the effective user input.

Figure 6:
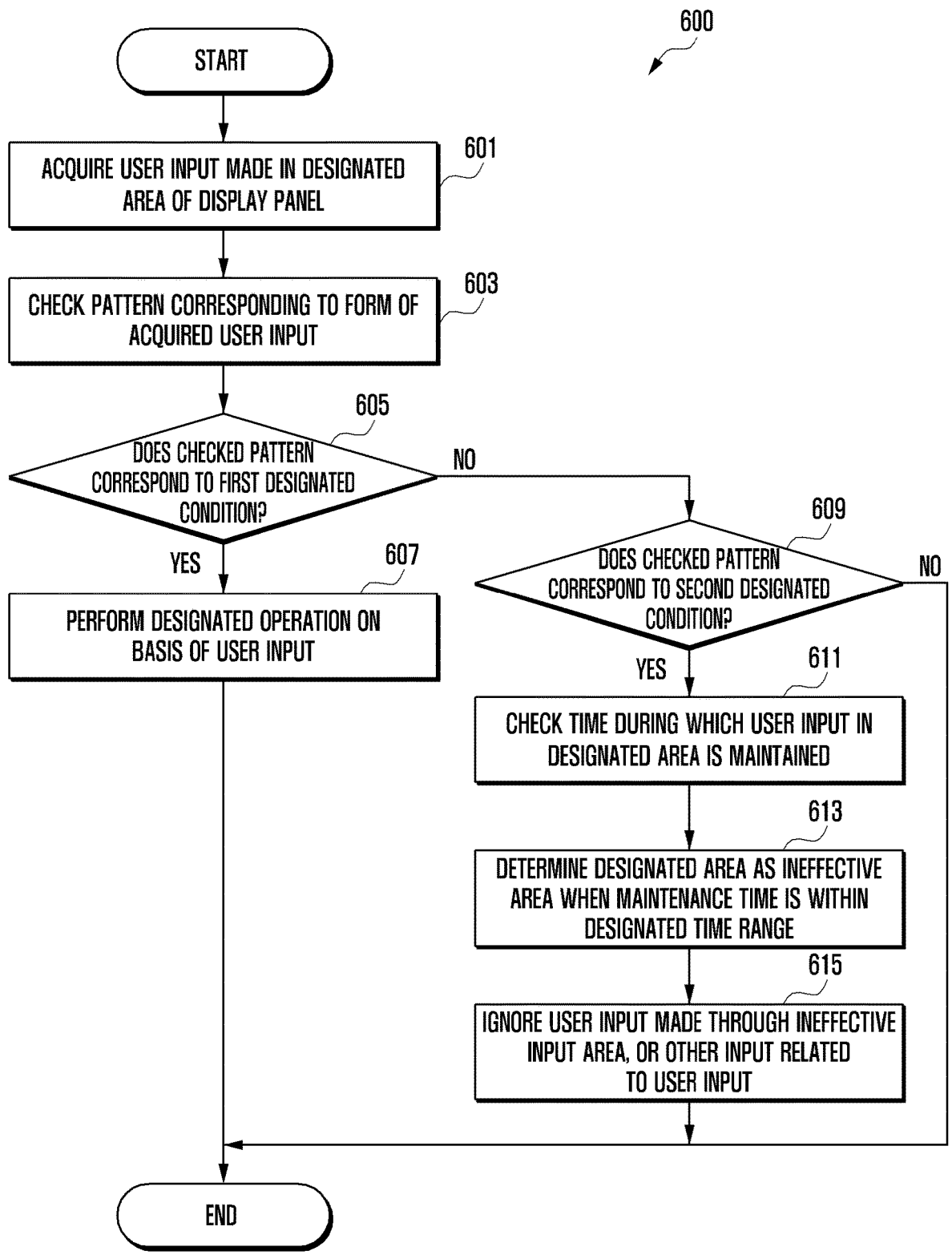
FIG. 6 is a flowchart illustrating a method of processing user input detected on a display panel, according to various embodiments.

FIG. 6 is a flowchart 600 illustrating a method of processing a user input detected on a display panel according to various embodiments.

Referring to FIG. 6, in operation 601, a touch controller (e.g., the touch controller 320 of FIG. 3) may acquire a user input made in a designated area of the display panel (e.g., the display panel 340 of FIG. 3).

In an embodiment, the display panel may include a touch sensor (e.g., the touch sensor 310 of FIG. 3). In an embodiment, the touch sensor may be implemented in at least one of a self-capacitance method or a mutual-capacitance method.

In an embodiment, the touch controller 320 may acquire a designated physical quantity, such as a capacitance value Cm, which changes as a user input is detected, and may generate a digital value corresponding to the acquired capacitance value Cm. The touch controller 320 may generate delta data for each of a plurality of sensor nodes by performing calibration, filtering, or the like on the digital value. The touch controller 320 may calculate locations (e.g., coordinates) on the display panel where the user input has occurred, based on the generated delta data, and configure the designated area to which the user input is made, based on the same.

In an embodiment, the user input may be acquired when the display-driving circuit (e.g., the display-driving circuit 330 of FIG. 3) is in an inactive state (or a sleep state, a low-power state), or may be acquired in an activated state (or a wake-up state).

In an embodiment, in operation 603, the touch controller 320 may check (e.g., identify) a pattern corresponding to the form of the acquired user input.

In an embodiment, the pattern corresponding to the form of the user input may include at least one of a direction and a position in which the user input is detected, a speed of the user input, a moving state of the user input, or a size of the user input. For example, the touch controller 320 may check whether the user input is detected in the edge area of the display panel (e.g., the display panel 340 of FIG. 3), whether the distance between the position on the display panel at which the user input is detected and the outer periphery of the display panel is within a designated range, or whether the size of the pattern corresponding to the form of the user input is less than or equal to the designated size, and, based thereon, may determine whether the pattern corresponding to the form of the user input in operations 605 and 609 to be described later corresponds to the first designated condition or the second designated condition.

In an embodiment, data about the pattern corresponding to the form of the user input may be stored in advance in memory, for example, a register (e.g., user input configuration data 543 of FIG. 5).

In an embodiment, in operation 605, the touch controller 320 may determine whether the checked pattern corresponds to the first designated condition.

In an embodiment, when the user input is not detected in the edge area of the display panel, when the distance between the location where the user input on the display panel is detected and the outer edge of the display panel is not within a designated range, or when the size of the pattern corresponding to the form of the user input is less than or equal to the designated size, the touch controller 320 may determine that the checked pattern corresponds to the first designated condition.

In an embodiment, if the checked pattern corresponds to the first designated condition, the touch controller 320 may perform a designated operation based on a user input in operation 607. For example, if the checked pattern corresponds to the first designated condition, the touch controller 320 may determine the user input to be an effective input. In response to determining that the user input is an effective input, the touch controller 320 may transfer data corresponding to the user input (e.g., touch, double touch, long touch, etc.) detected on the display panel to a processor (e.g., the processor 360 of FIG. 3). The processor 360 may perform a corresponding function corresponding to the received user input.

In an embodiment, data related to an effective user input, such as a touch, a double touch, and a long touch, may be stored in advance in a memory such as a register (e.g., user input detection unit 544a and user input release unit 544b of FIG. 5).

In an embodiment, when the checked pattern does not correspond to the first designated condition, the touch controller 320 may determine in operation 609 whether the checked pattern corresponds to the second designated condition.

In an embodiment, when a user input is detected in the edge area of the display panel, when the distance between the location where the user input is detected on the display panel and the outer edge of the display panel is within a designated range, or when the size of the pattern corresponding to the form of the user input exceeds the designated size, the touch controller 320 may determine that the checked pattern corresponds to the second designated condition.

In an embodiment, when the checked pattern corresponds to the second designated condition, the touch controller 320 may check the time during which the user input is maintained with respect to the designated area in operation 611. If the time included within the designated time range, the touch controller 320 may determine the designated area to be an ineffective input area in operation 613.

In an embodiment, in operation 615, the touch controller 320 may ignore a user input made through the ineffective input area or other input related to the user input.

In an embodiment, the touch controller 320 may determine an area other than the determined ineffective input area to be an effective input area, and when a new user input is made through the effective input area, the touch controller 320 may transmit data on the new input to the processor 360.

In an embodiment, although not illustrated, if the time during which the user input is maintained with respect to the designated area does not fall within the designated time range, the touch controller 320 may determine that the user input is released.

In FIG. 6 according to an embodiment, although it has been explained that after checking the pattern corresponding to the form of the acquired user input, the operations of determining whether the checked pattern corresponds to the first designated condition or the second designated condition and checking the time during which the user input is maintained are performed when the checked pattern corresponds to the second designated condition, the disclosure is not limited thereto. In an embodiment, when acquiring a user input made in a designated area, the touch controller 320 may check the time during which the acquired user input is maintained and then perform an operation of checking a pattern corresponding to the form of the user input. For example, if the time during which the user input is maintained included within the first designated time range, the touch controller 320 may determine whether the pattern corresponding to the form of the user input corresponds to a first designated condition or a second designated condition. When the pattern corresponding to the form of the user input corresponds to a first designated condition, the touch controller 320 may perform a designated operation based on the user input. When the pattern corresponding to the form of the user input corresponds to the second designated condition, the touch controller 320 may determine the designated area in which the user input is made to be an ineffective input area and ignore the user input or other input related to the user input. When the time during which the user input is maintained included within the second designated time range, the designated area in which the user input is made may be determined to be an ineffective input area, and the user input or other input related to the user input may be ignored.

FIG. 7 is a flowchart 700 illustrating a method of processing at least one user input detected on a display panel according to various embodiments.

FIG. 7 according to an embodiment is a diagram for explaining in detail a method of processing the user input when the pattern corresponding to the form of the user input in FIG. 6 corresponds to a second designated condition.

Referring to FIG. 7, in operation 701, when at least one user input is detected on a display panel (e.g., the display panel 340 of FIG. 3), a touch controller (e.g., the touch controller 320 of FIG. 3) may generate data, such as delta data, about a magnitude of change of a signal according to the detection of the at least one user input. For example, in response to detection of at least one user input on the display panel, the capacitance value Cm, which changes depending on the position where the at least one user input is detected, may be digitized and a digital value corresponding to the capacitance value Cm may be generated. By performing calibration, filtering, etc. on the digital value corresponding to the generated capacitance value Cm, delta data for each of a plurality of nodes constituting a touch sensor (e.g., the touch sensor 310 of FIG. 3) may be generated.

In an embodiment, in operation 703, the touch controller 320 may check a location (e.g., coordinates) on the display panel at which at least one user input is detected, based on data (e.g., delta data) on the magnitude of change of the generated signal.

In an embodiment, in operation 705, the touch controller 320 may set a designated area for a location where the at least one user input is detected. For example, the touch controller 320 may configure an area including a central node at a location where the at least one user input is detected among all nodes constituting a touch sensor included in the display panel and at least one peripheral node adjacent to the central node as the designated area.

In an embodiment, the touch controller 320 may search (e.g., scan) delta data for all nodes constituting the touch sensor based on the position at which each of at least one user input is detected. Based on the search result, the touch controller 320 may determine, for example, a local peak having a maximum delta data value among the delta data as the central node.

In an embodiment, the touch controller 320 may search for at least one peripheral node adjacent to the determined central node. For example, the at least one peripheral node may include at least one node having a delta data value smaller than a maximum delta data value of the determined central node and larger than a noise floor, representing a maximum noise value.

In an embodiment, the touch controller 320 may configured an area including a center node having the maximum delta data value and at least one peripheral node adjacent to the center node as a designated area.

In an embodiment, in operation 707, the touch controller 320 may check the pattern corresponding to the form of at least one user input and check whether at least one user input in a designated area is maintained during a designated time.

In an embodiment, as a result of checking a pattern corresponding to the form of at least one user input, when the at least one user input is detected in an edge area of the display panel, when the distance between the location where the at least one user input is detected on the display panel and the outer edge of the display panel is within a designated range, or when the size of the pattern corresponding to the form of the at least one user input exceeds a designated size, the touch controller 320 may determine whether the at least one user input is maintained for a designated time.

In an embodiment, if at least one user input is maintained for a designated time, the touch controller 320 may configured count values of all nodes constituting the touch sensor in operation 709.

In an embodiment, the touch controller 320 may apply different weight values to count values of all nodes constituting the touch sensor based on at least one of the number of the detected at least one user input, the degree of proximity between the plurality of designated areas for the plurality of user inputs when the at least one user input is plural in number, whether the plurality of designated areas overlap, or the time during which the at least one detected user input is maintained.

In an embodiment, after configuring the count values of all nodes constituting the touch sensor, the touch controller 320 may compare the count values set in all nodes constituting the touch sensor with a designated reference value in operation 711. In operation 713, the touch controller 320 may determine whether the designated area is an ineffective input area based on the comparison result. For example, the touch controller 320 may determine an area including at least one node having a count value equal to or greater than a designated value among all nodes to be an ineffective input area, and may determine an area including at least one node having a count value less than the designated value to be an effective input area.

Figure 8A:
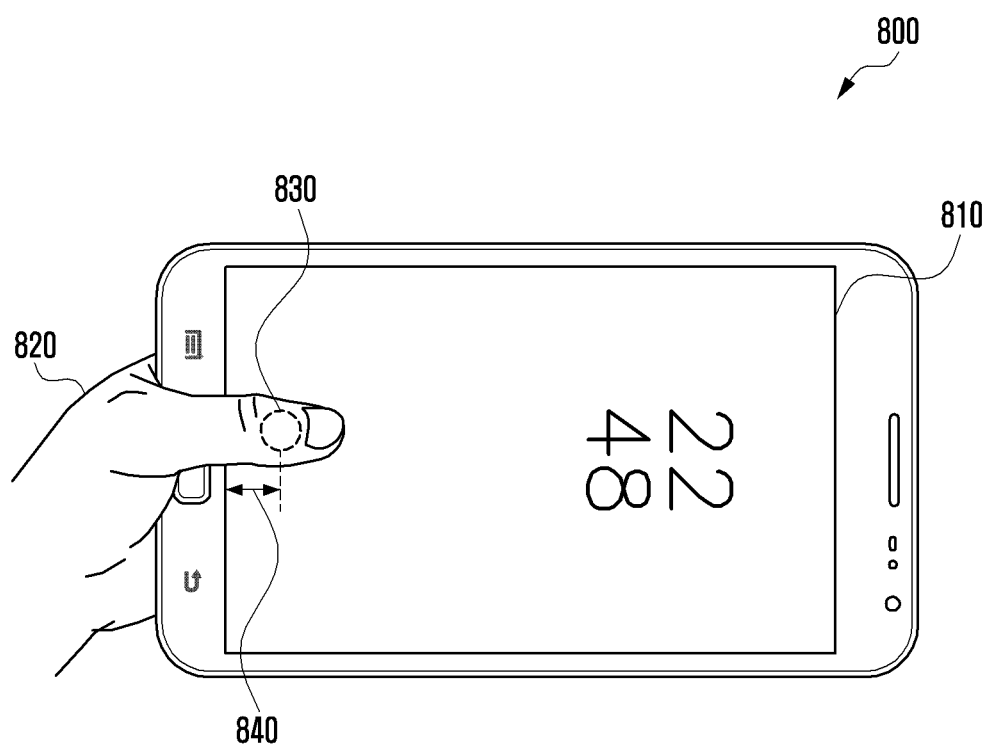

FIGS. 8A to 8C are diagrams 800 illustrating a method of processing a single user input detected on a display panel according to various embodiments.

In FIGS. 8A to 8C according to an embodiment, the explanation is made based on the assumption that the user input 830 is detected within a designated range 840 from the distance between the outer edges of the display panel 810 (e.g., the display panel 340 of FIG. 3)

Referring to FIG. 8A, when the electronic device (e.g., the electronic device 301 of FIG. 3) is held in the user's hand 820, user input 830 may be detected on the display panel 810.

Referring to FIG. 8B, a touch sensor (e.g., the touch sensor 310 of FIG. 3) included in the display panel 810 may include a sensing array 860. The sensing array 860 may include conductive lines arranged along a direction of a row 850 or a direction of a column 840. Each of the intersection points of the conductive lines may correspond to a specific set of coordinates on the display panel 810. The touch sensor may be composed of a plurality of sensor nodes (e.g., N*M) formed at intersections of the conductive lines. The touch controller (e.g., the touch controller 320 of FIG. 3) may acquire a capacitance value Cm of each intersection point of the conductive lines, which is changed according to the detection of the user input 830. The touch controller may generate a digital value corresponding to the obtained capacitance value Cm. The touch controller may generate delta data for each of the plurality of nodes by performing correction or filtering on the generated digital value.

In an embodiment, FIG. 8B shows only at least some nodes (e.g., C01:R10) including the location at which the user input 830 is detected, among all nodes constituting the touch sensor.

In an embodiment, the touch controller may search (e.g., scan) all nodes constituting the touch sensor to extract the node having the maximum delta data value. Based on the search result, the touch controller may configure the node (e.g., C06, R05) having the maximum delta data value (e.g., 574) among all nodes as the central node 870. The touch controller may search for at least one peripheral node adjacent to the central node 870. For example, the at least one peripheral node may include at least one node having a node value smaller than the maximum delta data value (574) of the central node 870 and larger than the noise floor (e.g., 10), representing the maximum noise value. The touch controller may set an area including the center node 870 and at least one peripheral node adjacent to the center node 870 as a designated area 875.

In an embodiment, the touch controller may check a pattern corresponding to the form of the user input 830 and check whether the user input 830 is maintained for a designated time in the designated area 875.

In an embodiment, because the user input 830 is detected within a designated range 840 from the distance between the outer periphery of the display panel 810, the touch controller may determine that the pattern corresponding to the form of the user input 830 corresponds to a second designated condition, and may check the duration of the user input 830 in the designated area 875.

In an embodiment, when the user input 830 is maintained for a designated time, the touch controller may configure a count value of all nodes constituting the touch sensor to determine whether ineffective user input 830 is performed. For example, as illustrated in FIG. 8C, the touch controller may configure (880) the count value for at least one node of the designated area 875 as 1, for example, when user input 830 is detected. The touch controller may configure (885) the count value for at least one node other than the designated area 875 to an area where the user input 830 is not detected, for example, as 0.

The count value according to an embodiment is specifically configured herein merely to aid in understanding of the disclosure, and is not limited thereto.

In an embodiment, the touch controller may compare a count value set in all nodes constituting the touch sensor with a designated reference value and determine an ineffective input area and an effective input area for all nodes based on the comparison result. For example, the touch controller may determine an area having a count value equal to or greater than a designated reference value among all nodes constituting the touch sensor, for example, an area including at least one node having a count value of 1, to be an ineffective input area. The touch controller may determine an area having a count value less than a designated reference value among all nodes, for example, an area including at least one node having a count value of 0 to be an effective input area.

In an embodiment, if the time during which the user input 830 in the designated area 875 is maintained exceeds a designated time, the touch controller may apply a weight corresponding to the excess time to the count value for the node in the designated area 875. When the time during which the user input 830 is maintained exceeds the designated time, it is possible to quickly determine an ineffective input area for the designated area 875 by applying a weight value to the count value, and accordingly, it is possible to prevent unintentional user input 830 from being recognized.

Figure 9:
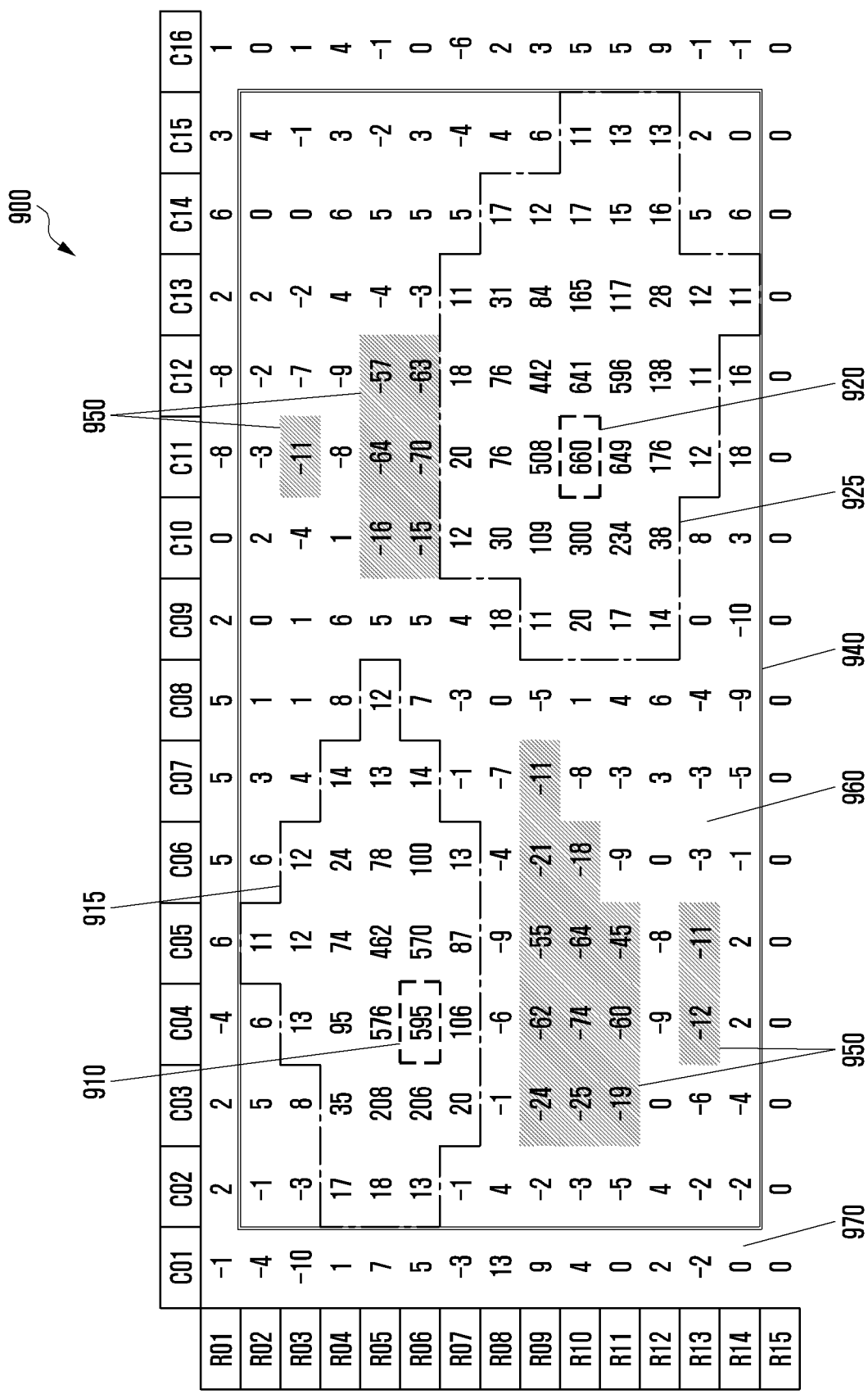
FIG. 9 is a diagram illustrating a method of processing a plurality of user inputs detected on a display panel according to various embodiments of the disclosure.

FIG. 9 is a diagram 900 illustrating a method of processing a plurality of user inputs detected on a display panel according to various embodiments of the disclosure.

In FIG. 9 according to an embodiment, an explanation is provided on the basis of an assumption that two user inputs, for example, a first user input and a second user input, are detected in an edge area of a display panel (e.g., the display panel 340 of FIG. 3) in proximity.

Referring to FIG. 9, a touch controller (e.g., the touch controller 320 of FIG. 3) may detect two user inputs on the display panel. The touch controller may acquire a designated physical quantity, for example, a capacitance value Cm, which changes as the two user inputs are detected, and may generate a digital value corresponding to the acquired capacitance value Cm. The touch controller may generate delta data for each of a plurality of nodes by performing correction, filtering, etc. on the generated digital value.

In an embodiment, the touch controller may search (e.g., scan) all nodes constituting a touch sensor (e.g., the touch sensor 310 of FIG. 3) included in the display panel, based on two user inputs to extract the node with the maximum delta data value. Based on the search result, the touch controller may configure the node (e.g., C04, R06) having the maximum delta data value (e.g., 595) for a first user input among all nodes constituting the touch sensor as the first central node 910, and may configure the node (e.g., C11, R10) having the maximum delta data value (e.g., 660) for the second user input as the second central node 920.

In an embodiment, the touch controller may search for at least one peripheral node adjacent to the first central node 910, and may configure an area including the first central node 910 and the at least one peripheral node as the first designated area 915. For example, at least one peripheral node adjacent to the first central node 910 may include at least one node having a node value smaller than the maximum delta data value 595 of the first central node 910 and having a maximum noise value larger than the noise floor (e.g., 10). The touch controller may search for at least one peripheral node adjacent to the second central node 920, and may configure an area including the second central node 920 and the at least one peripheral node as a second designated area 925. For example, at least one peripheral node adjacent to the second central node 920 may include at least one node having a node value smaller than the maximum delta data value 660 of the second central node 920 and larger than the noise floor (e.g., 10), representing the maximum noise value.

In an embodiment, when two user inputs are detected, the touch controller may check the degree of proximity between the first designated area 915 for the first user input and the second designated area 925 for the second user input. If the distance between the first designated area 915 and the second designated area 925 is within a designated range, the touch controller may configure the area (e.g., C2:R14) including rows and columns crossing the first designated area 915 and the second designated area 925 among all nodes constituting the touch sensor as an ineffective input candidate area 940.

In an embodiment, the touch controller may check the pattern corresponding to the form of the first user input and the second user input, and check whether the first user input and the second user input are maintained for a designated time in the first designated area 915 and the second designated area 925, respectively.

In an embodiment, as the first user input and the second user input are detected in the edge area of the display panel, the touch controller may determine that the pattern corresponding to the first user input and the second user input corresponds to the second designated condition, and check the duration of the first user input and the second user input in the first designated area 915 and the second designated area 925.

In an embodiment, when the first user input 910 and the second user input 920 are maintained for a designated time, the touch controller may configure a count value of all nodes constituting the touch sensor for determining whether ineffective input for the first user input and the second user input is performed.

In an embodiment, the touch controller may configure the ineffective input candidate area 940 before determining the first designated area 915 and the second designated area 925 as ineffective input areas. For example, when at least two user inputs are detected, a ghost touch phenomenon, which appears as input at a location where user input does not actually occur, may occur due to noise interference. The operation of setting the ineffective input candidate area 940 may be an operation for applying different weight values to the count value of at least one node with high noise interference in which no user input is detected and at least one node with low noise interference, in consideration of the ghost touch due to noise interference that may be generated by the at least two user inputs.

For example, the touch controller may configure a count value for at least one node of the first designated area 915 and the second designated area 925 as 1 according to the detection of the first user input and the second user input. The touch controller may apply, for example, a double weight value to the count value for a node having a high probability of generating a ghost touch in the configured ineffective input candidate area, for example, at least one node 950 having a node value smaller than the negative noise floor representing the lowest noise value. The touch controller may apply, for example, a ½ times weight value to the count value for at least one node 960 having relatively little noise introduced from the configured ineffective input candidate area 940. The touch controller may configure the count value for at least one node 970 excluding the ineffective input candidate area 940 among all nodes constituting the touch sensor, for example, as 0.

In an embodiment, the touch controller may compare a count value configured differently with a designated reference value for all nodes constituting the touch sensor, and determine an ineffective input area and an effective input area for all nodes based on the comparison result. For example, the touch controller may determine an area including at least one node having a count value equal to or greater than a designated reference value among all nodes to be an ineffective input area, and may determine an area including a node having an area including at least one node having a count value less than a designated reference value to be an effective input area.

Figure 10A:
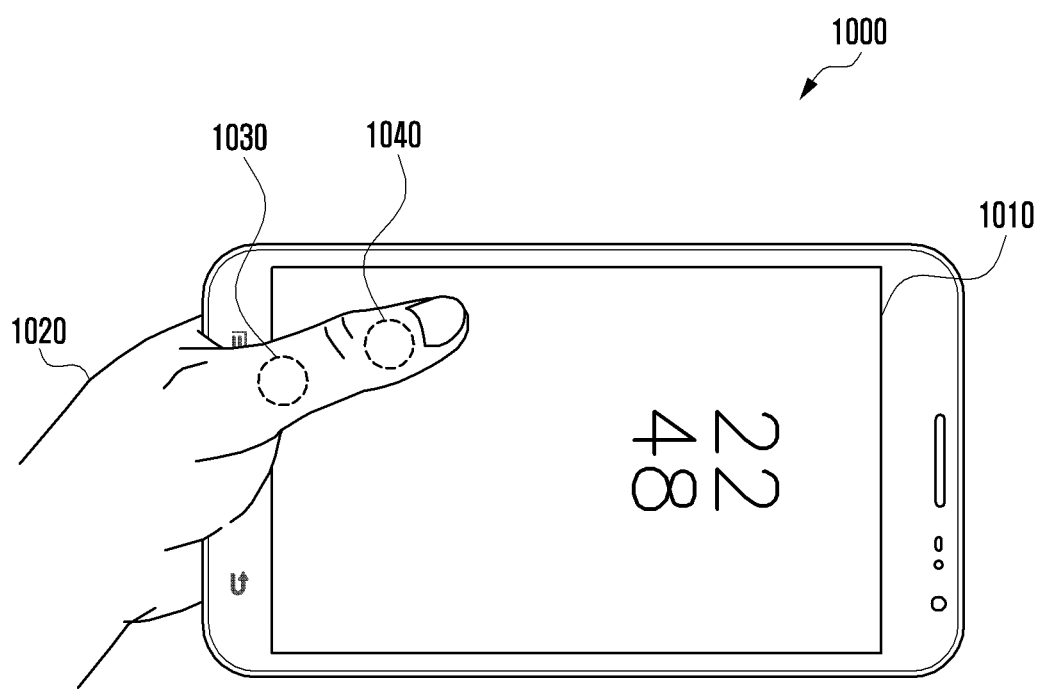
Figure 10B:
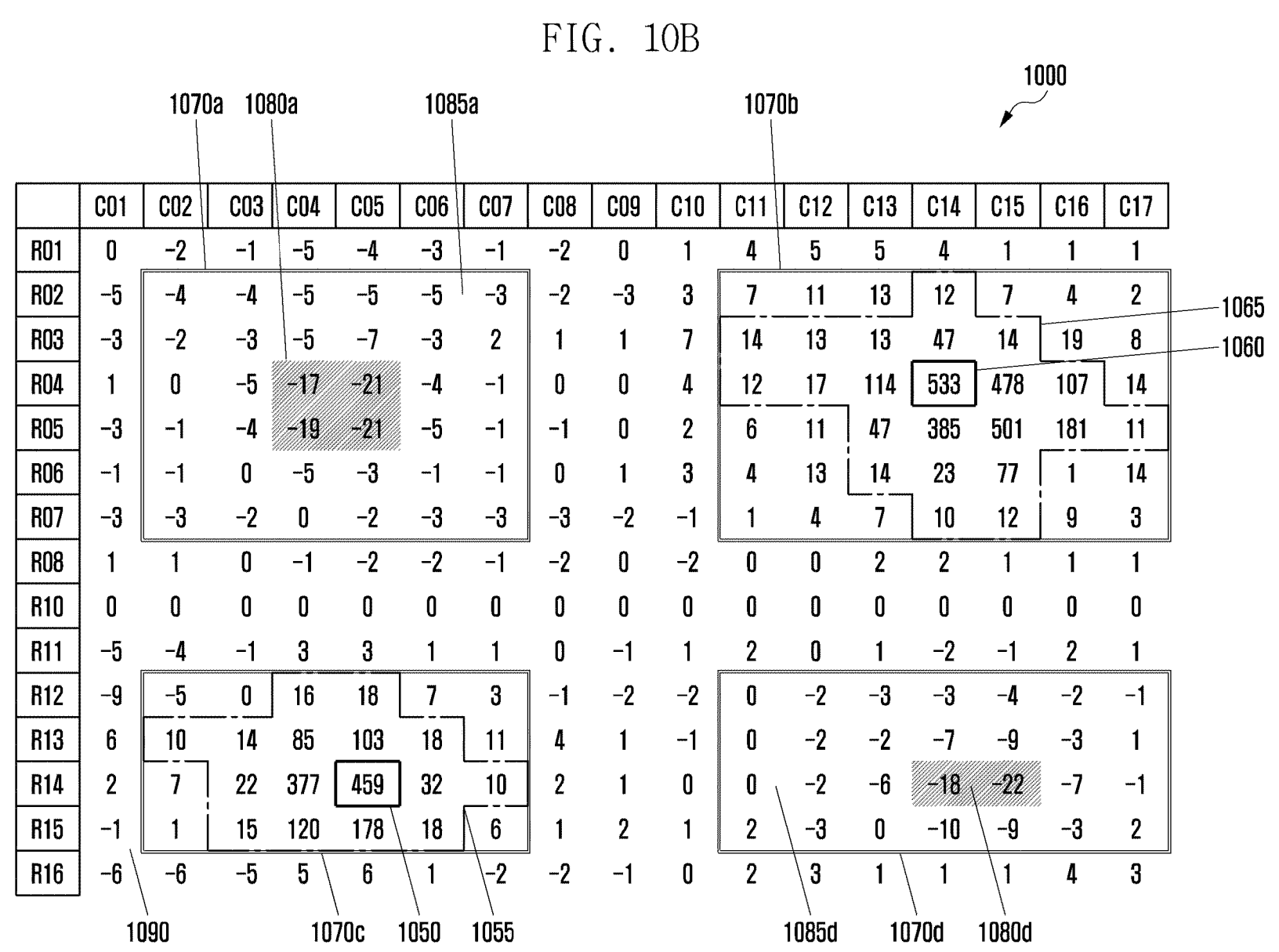

FIGS. 10A and 10B are diagrams 1000 illustrating a method of processing a plurality of user inputs detected on a display panel according to various embodiments.

FIGS. 10A and 10B according to an embodiment will be explained based on the assumption that two user inputs, namely a first user input 1030 and a second user input 1040, are detected in the edge area of the display panel (e.g., the display panel 340 of FIG. 3) spaced apart from a designated range.

Referring to FIG. 10A, as an electronic device (e.g., the electronic device 301 of FIG. 3) is held in the user's hand 1020, the first user input 1030 and the second user input 1040 may be detected on the display panel 1010. A touch controller (e.g., the touch controller 320 of FIG. 3) may acquire a designated physical quantity, e.g., a capacitance value (Cm), which changes as two user inputs 1030 and 1040 are detected, and generate a digital value corresponding to the obtained capacitance value Cm. The touch controller 320 may perform correction, filtering, etc. on the generated digital value to generate delta data for each of a plurality of nodes, as illustrated in FIG. 10B.

In an embodiment, the touch controller 320 may search (e.g., scan) all nodes constituting a touch sensor (e.g., the touch sensor 310 of FIG. 3) included in the display panel 1010 based on at least two user inputs (1030, 1040) and may extract the node with the maximum delta data value. Based on the search result, the touch controller 320 may configure the node (e.g., C05, R14) having the maximum delta data value (e.g., 459) for the first user input 1030 among all nodes constituting the touch sensor as a first central node 1050, and configure a node (e.g., C14, R04) having a maximum delta data value (e.g., 533) for the second user input 1040 as a second central node 1060.

In an embodiment, the touch controller 320 may search for at least one peripheral node adjacent to the first central node 1050, and may configure an area including the first central node 1050 and the at least one peripheral node as a first designated area 1055. For example, at least one peripheral node adjacent to the first central node 1050 may include nodes having a node value smaller than the maximum delta data value 459 of the first central node 1050 and larger than the noise floor (e.g., 10), representing the maximum noise value. The touch controller 320 may search for at least one peripheral node adjacent to the second central node 1060, and may determine an area including the second central node 1060 and the at least one peripheral node to be a second designated area 1065. For example, at least one peripheral node adjacent to the second central node 1060 may include a node having a node value smaller than the maximum delta data value 533 of the second central node 1060 and larger than the noise floor (e.g., 10), representing the maximum noise value.

In an embodiment, when at least two or more user inputs, for example, two user inputs 1030 and 1040, are detected, the touch controller 320 may check proximity information between the first designated area 1055 for the first user input 1030 and the second designated area 1065 for the second user input 1040. If the distance between the first designated area 1055 and the second designated area 1065 is not included within the designated range, the touch controller 320 may configure the area (e.g., C02:R07, C11:R07, C02: R15, C11:R15) crossing the row and column of each of the first designated area 1055 and the second designated area 1065 among all nodes constituting the touch sensor as ineffective input candidate areas 1070a, 1070b, 1070c, 1070d.

In an embodiment, the touch controller 320 may check a pattern corresponding to the forms of the first user input 1030 and the second user input 1040, and may check whether the first user input 1030 and the second user input 1040 are maintained for a designated time in the first designated area 1050 and the second designated area 1060.

In an embodiment, as the first user input 1030 and the second user input 1040 are detected in the edge area of the display panel 1010, the touch controller 320 may determine that the pattern corresponding to the first user input 1030 and the second user input 1040 corresponds to a second designated condition, and may check the time during which the first user input 1030 and the second user input 1040 are maintained in the first designated area 1055 and the second designated area 1065.

In an embodiment, when the first user input 1030 and the second user input 1040 are maintained for a designated period of time, the touch controller 320 may configure a count value of all nodes constituting the touch sensor for determining whether the first user input 1030 and the second user input 1040 are ineffective.

In an embodiment, the touch controller 320 may configure the ineffective input candidate areas 1070a, 1070b, 1070c, and 1070d before determining the first designated area 1055 and the second designated area 1065 to be ineffective input areas. In an embodiment, the touch controller 320 may differently configure the count value for at least one node included in the ineffective input candidate areas 1070a, 1070b, 1070c, and 1070d. For example, the touch controller 320 may configure a count value for at least one node of the first designated area 1055 and the second designated area 1065 according to the detection of the first user input 1030 and the second user input 1040 as, for example, 1. The touch controller 320 may apply, for example, a double weight value to the count value for at least one node 1080a and 1080d having a node value (e.g. −10) smaller than a negative noise floor (−NF), representing the lowest noise value, for example, a node with a high probability of ghost touch occurrence in the set ineffective input candidate areas 1070a, 1070b, 1070c, and 1070d. The touch controller 320 may apply, for example, a ½ times weight value to the count value for at least one node 1085a and 1085b having relatively little noise introduced from the set ineffective input candidate areas 1070a, 1070b, 1070c, and 1070d. The touch controller 320 may configure a count value for at least one node 1090 other than the ineffective input candidate areas 1070a, 1070b, 1070c, and 1070d, among all nodes constituting the touch sensor, for example, as 0.

In an embodiment, the touch controller 320 may compare a count value, configured with a different designated reference value for each of all nodes constituting the touch sensor and a designated reference value, and may determine an ineffective input area and an effective input area for all nodes, based on the comparison result. For example, the touch controller 320 may determine an area including at least one node having a count value equal to or greater than a designated reference value among all nodes to be an ineffective input area, and may determine an area including at least one node having a count value less than a designated reference value to be an effective input area.

Figure 11A:
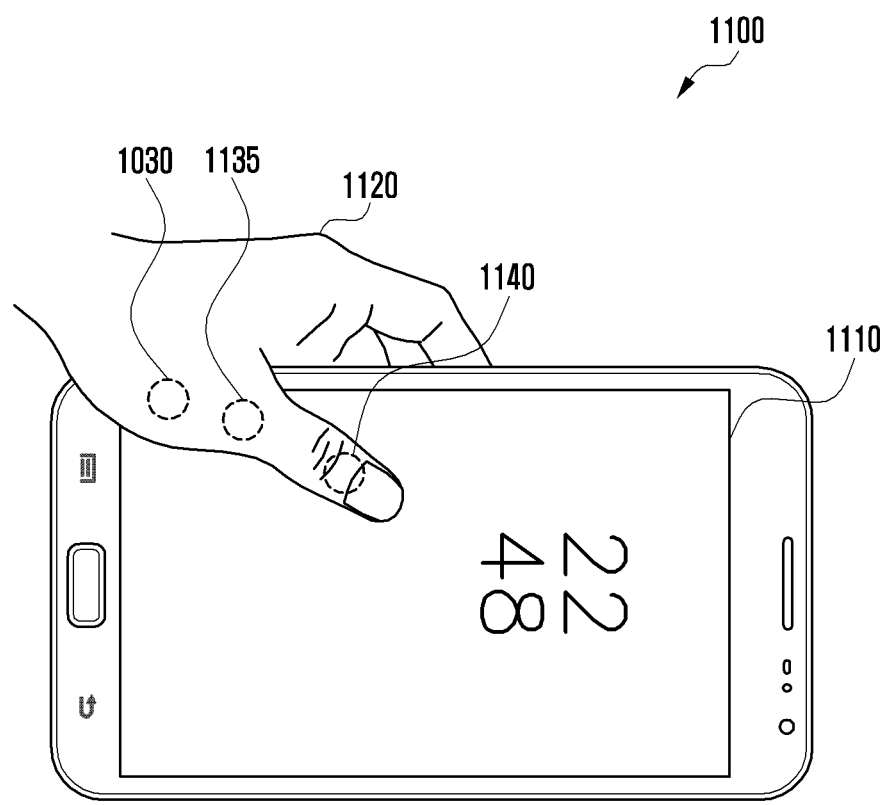

FIGS. 11A and 11B are diagrams 1100 illustrating a method of processing a plurality of user inputs detected on a display panel, according to various embodiments.

FIGS. 11A and 11B according to an embodiment will be explained based on the assumption that three user inputs 1130, 1135, and 1140 are closely detected in an edge area of the display panel 1110 (e.g., the display panel 340 of FIG. 3).

Referring to FIG. 11A, as an electronic device (e.g., the electronic device 301 of FIG. 3) is held in a user's hand 1120, three user inputs 1130, 1135, and 1140 may be detected on the display panel 1110. A touch controller (e.g., the touch controller 320 of FIG. 3) may acquire a designated physical quantity, for example, a capacitance value (Cm), which changes as three user inputs 1130, 1135, and 1140 are detected, and generate a digital value corresponding to the acquired capacitance value Cm. The touch controller 320 may perform correction, filtering, etc. on the generated digital value to generate delta data for each of a plurality of nodes, as illustrated in FIG. 11B.

In an embodiment, the touch controller 320 may search (e.g., scan) all nodes constituting a touch sensor (e.g., the touch sensor 310 of FIG. 3) included in the display panel 1110, based on three user inputs (1130, 1135, 1140) to extract the node with the maximum delta data value. Based on the search result, the touch controller 320 may configure a node (e.g., C03, R03) having a maximum delta data value (e.g., 560) for the first user input 1130, among all nodes constituting the touch sensor, as a first central node (1145), configure a node (e.g., C05, R06) having a maximum delta data value (e.g., 593) for the second user input 1135 as a second central node 1150, and configure a node (e.g., C07, R08) having a maximum delta data value (e.g., 646) for the third user input 1140 as a third central node 1155.

In an embodiment, the touch controller 320 may search for at least one peripheral node adjacent to the first central node 1145, and may configure an area including the first central node 1145 and the at least one peripheral node as a first designated area. For example, at least one peripheral node adjacent to the first central node 1145 may include at least one node having a node value smaller than the maximum delta data value 560 of the first central node 1145 and larger than the noise floor (e.g., 10), representing the maximum noise value. The touch controller 320 may search for at least one peripheral node adjacent to the second central node 1150, and may configure an area including the second central node 1150 and the at least one peripheral node as a second designated area. For example, at least one peripheral node adjacent to the second center node 1150 may include at least one node having a node value smaller than the maximum delta data value 593 of the second central node 1150 and larger than the noise floor (e.g., 10), representing the maximum noise value. The touch controller 320 may search for at least one peripheral node adjacent to the third central node 1155, and may configure an area including the third central node 1155 and the at least one peripheral node as a third designated area. For example, at least one peripheral node adjacent to the third central node 1155 may include at least one node having a node value smaller than the maximum delta data value 646 of the third central node 1155 and larger than the noise floor (e.g., 10), representing the maximum noise value.

In an embodiment, when two or more user inputs, such as three user inputs 1130, 1135, and 1140, are detected, the touch controller 320 may check the degree of proximity between a first designated area for the first user input 1130, a second designated area for the second user input 1035, and a third designated area for the third user input 1140. As the adjacent distance between the first user input to the third user input (1130, 1135, 1140) is within the designated range, at least some nodes of the first designated area for the set first user input 1130 and at least some nodes of the second designated area for the second user input 1135 may overlap each other, and at least some nodes of the second designated area and at least some nodes of the third designated area for the third user input 1140 may overlap each other. The touch controller 320 may configure a first designated area to a third designated area, overlapping with respect to the first to third user inputs 1130, 1135, and 1140, as one designated area 1160. The touch controller 320 may configure an area including rows and columns (e.g., C01:R13) crossing the one designated area 1160, among all nodes constituting the touch sensor, as the ineffective input candidate area 1170.

In an embodiment, the touch controller 320 may check a pattern corresponding to the form of the first user input to the third user input 1130, 1135, and 1140, and may check whether the first user input to the third user input 1130, 1135, and 1140 are maintained for a designated time in the first designated area to the third designated area.

In an embodiment, as the first to third user inputs 1130, 1135, and 1140 are detected in the edge area of the display panel 1110, the touch controller 320 may determine that a pattern corresponding to the first user input to the third user input 1130, 1135, and 1140 corresponds to a second designated condition, and may check the time during which the first user input to the third user input 1130, 1135, and 1140 are maintained. When the first user input to the third user input 1130, 1135, and 1140 are maintained for a designated time, the touch controller 320 may configure a count value of all nodes constituting the touch sensor to determine whether ineffective input for the first to third user inputs 1130, 1135, and 1140 has occurred.

In an embodiment, the touch controller 320 may configure the ineffective input candidate area 1170 and differently configure a count value for at least one node included in the ineffective input candidate area 1170, before determining the first to the third designated area 1065 for the first user input to the third user input 1130, 1135, 1140 to be an ineffective input area. For example, the touch controller 320 may apply, for example, a three-fold weight to the count value for at least one node of the ineffective input candidate area 1170 including the designated area 1160. The touch controller 320 may configure a count value for at least one node 1180 excluding the ineffective input candidate area 1170 among all nodes, for example, as 0.

In an embodiment, the touch controller 320 may compare a count value configured differently with a designated reference value for all nodes constituting the touch sensor, and may determine an ineffective input area and an effective input area for all nodes based on the comparison result. For example, the touch controller 320 may determine an area including at least one node having a count value equal to or greater than a designated value among all nodes to be an ineffective input area, and may determine an area including at least one node having a count value less than a designated value to be an effective input area.

Figure 12A:
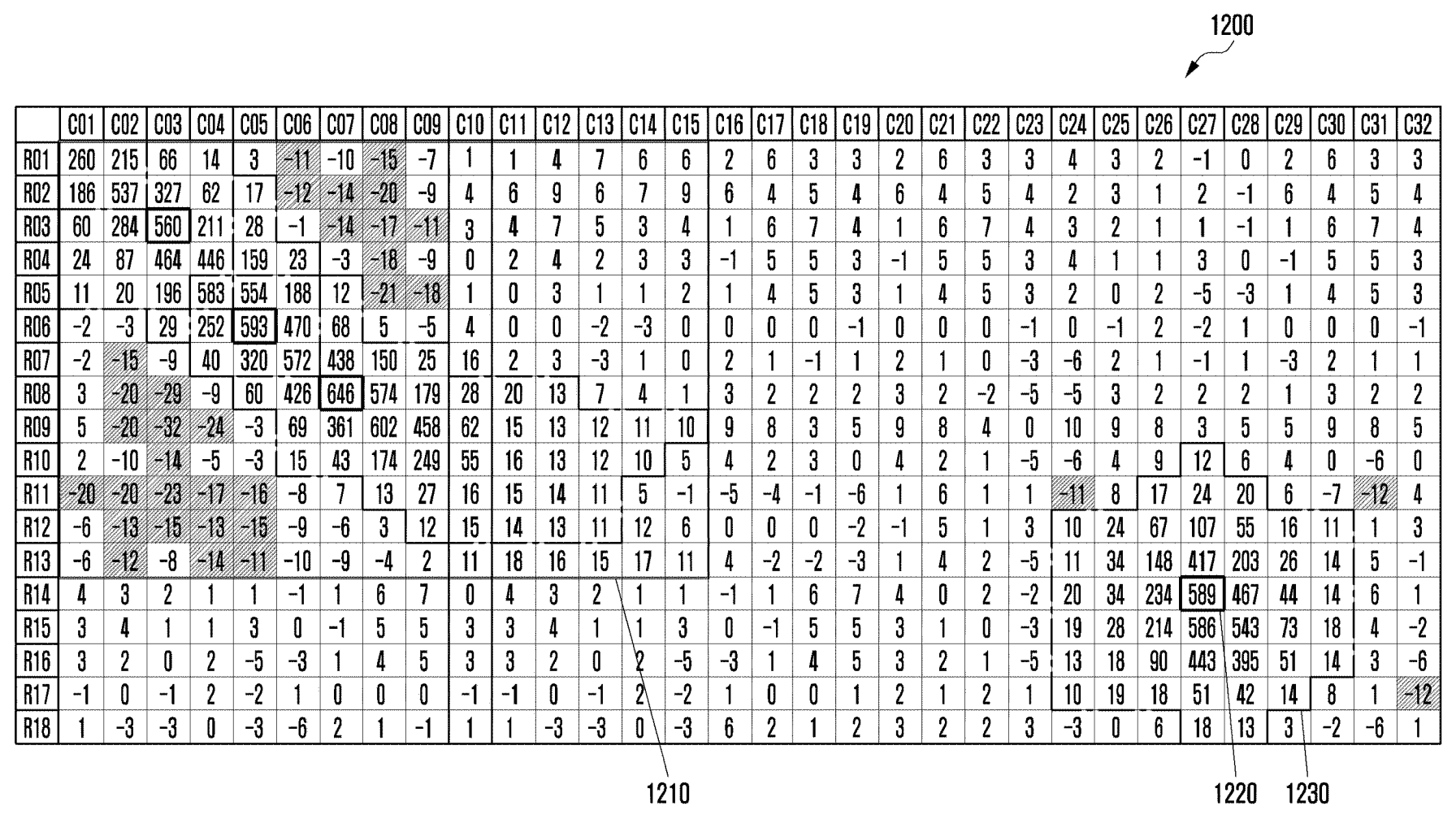
Figure 12B:
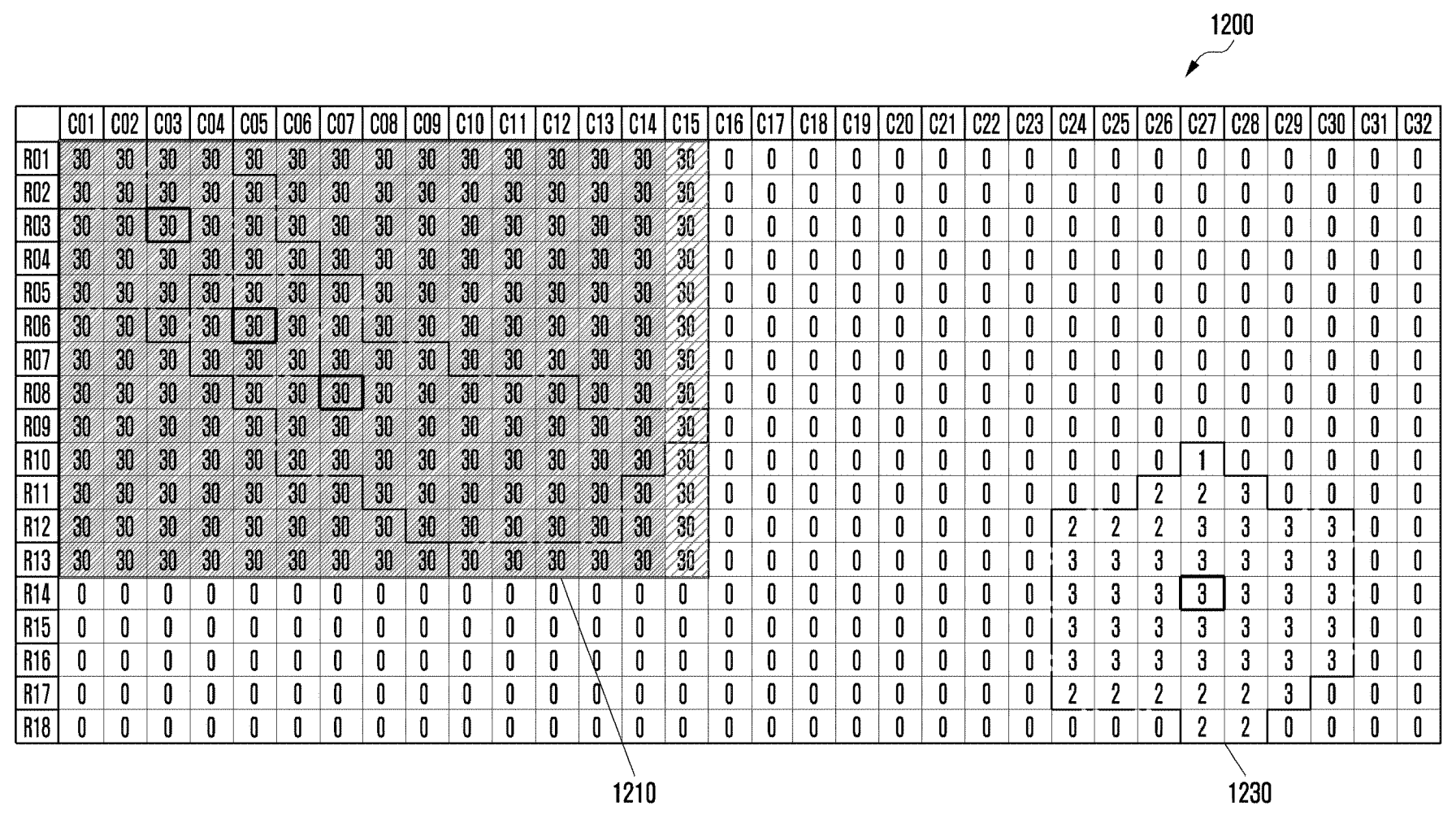

FIGS. 12A and 12B are diagrams 1200 illustrating a method of processing new user input when new user input is detected in the state in which an ineffective input area is determined according to various embodiments.

FIGS. 12A and 12B according to an embodiment illustrates the case in which new user input is detected in the state in which a designated area in which three user inputs 1130, 1135, and 1140 are detected on a display panel (e.g., the display panel 340 of FIG. 3) is determined to be an ineffective input area, as the electronic device (e.g., the electronic device 301 of FIG. 3) is being held in the user's hand (e.g., the hand 1120 of FIG. 11) as in FIG. 11A described above.

Referring to FIGS. 12A and 12B, as three user inputs 1130, 1135, and 1140 are closely detected in the edge area of the display panel, the touch controller (e.g., the touch controller 320 of FIG. 3) may configure the count value for at least one node of the ineffective input candidate area 1170 including the designated area 1160 to, for example, 30 by applying, for example, a triple weight value. The touch controller 320 may compare the configured count value with a designated reference value (e.g. 30), and may determine the ineffective input candidate area 1170 to be an ineffective input area 1210 based on the comparison result.

In an embodiment, the touch controller 320 may detect new user input in an area other than the ineffective input area 1210, for example, in an effective input area, while the ineffective input area 1210 is being determined. The touch controller 320 may search (e.g., scan) all nodes constituting a touch sensor (e.g., the touch sensor 310 of FIG. 3) included in the display panel, based on the position at which the new user input is detected in order to extract a node having a maximum delta data value for the new input. Based on the search result, the touch controller 320 may configure a node (e.g., C27, R14) having a maximum delta data value (e.g., 589) for the new user input among all nodes constituting the touch sensor as the central node 1220. The touch controller 320 may search for at least one peripheral node adjacent to the central node 1220, and may configure an area including the central node 1220 and the at least one peripheral node as a designated area 1230.

In an embodiment, the touch controller 320 may check a pattern corresponding to the form of new user input, and may check whether the new user input is maintained for a designated time in the designated area 1230.

In an embodiment, when new user input is maintained for a designated time, the touch controller 320 may configure a count value of all nodes constituting the touch sensor in order to determine whether the new user input is ineffective. For example, the touch controller 320 may configure a count value for at least one node in the designated area 1230 as, for example, 1 to 3 when a new user input is detected. The touch controller 320 may configure a count value for at least one node other than an area in which a new user input is not detected, such as an ineffective input area 1210 and a designated area 1220, for example, as 0. The touch controller 320 may compare the count value with a designated reference value (e.g., 30), and may determine the designated area 1230 to be an effective input area based on the comparison result. The touch controller 320 may transfer data on new user input made through the effective input area to a processor (e.g., the processor 360 of FIG. 3).

Figure 13:
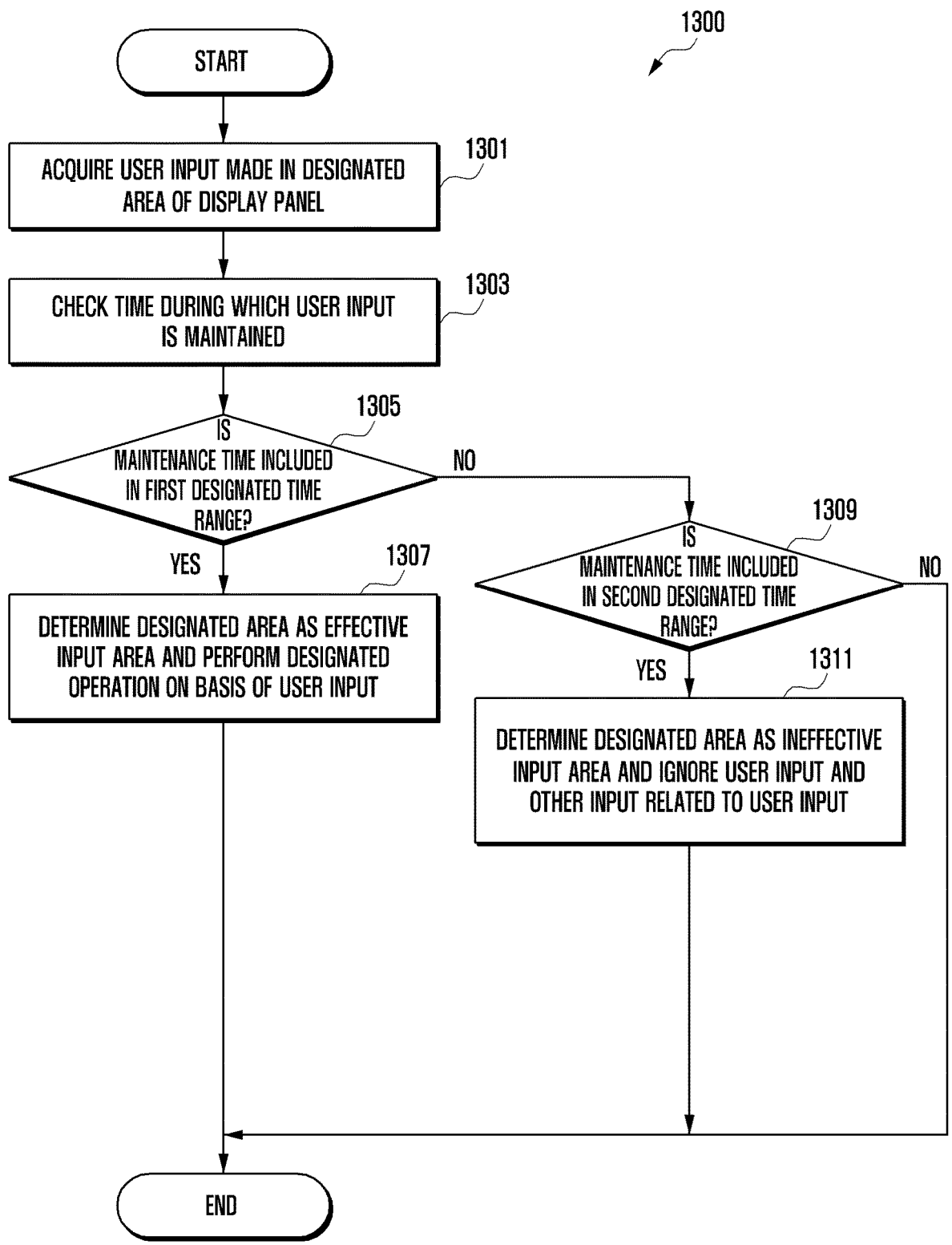
FIG. 13 is a flowchart illustrating a method of processing user input detected on a display panel, according to various embodiments.

FIG. 13 is a flowchart 1300 illustrating a method of processing user input detected on a display panel according to various embodiments.

Referring to FIG. 13, in operation 1301, a touch controller (e.g., the touch controller 320 of FIG. 3) may acquire user input made in a designated area of a display panel (e.g., the display panel 340 of FIG. 3).

In an embodiment, the user input may be acquired when the display-driving circuit (for example, the display-driving circuit 330 of FIG. 3) is in an inactive state (or a sleep state, a low-power state) or an active state (or a wake-up state).

In an embodiment, in operation 1303, the touch controller 320 may check the time during which the user input acquired for the designated area is maintained, and in operation 1305, may determine whether the maintained time included within the first designated time range.

In an embodiment, when the maintained time included within the first designated time range, in operation 1307, the touch controller 320 may determine the designated area to be an effective input area, and may transmit data on user input made through the effective input area to a processor (e.g., the processor 360 of FIG. 3). The processor 360 may perform a designated operation based on the data on the received user input.

In an embodiment, although not shown, if the sustained time included within the first designated time range, the touch controller 320 may further determine whether the pattern corresponding to the form of the user input corresponds to a first designated condition or a second designated condition. For example, the touch controller 320 may determine whether a user input is detected in the edge area of the display panel, whether the distance between the position where the user input on the display panel is detected and the outer edge of the display panel is within a designated range, or whether the size of the pattern corresponding to the form of the user input is less than or equal to the designated size, and may determine whether the pattern corresponding to the form of the user input corresponds to the first designated condition or the second designated condition based thereon. When the pattern corresponding to the form of the user input corresponds to the first designated condition, the touch controller 320 may determine the designated area to be an effective input area and transfer data on user input made through the effective input area to the processor 360. When the pattern corresponding to the form of the user input corresponds to the second designated condition, the touch controller 320 may determine a designated area to which the user input is made to be an ineffective input area and ignore the user input or other input related to the user input.

In an embodiment, if the time during which the user input is maintained does not fall within the first designated time range, the touch controller 320 may determine whether the time during which the user input is maintained included within the second designated time range in operation 1309.

In an embodiment, if the time during which the user input is maintained included within the second designated time range, in operation 1311, the touch controller 320 may determine the designated area to be an ineffective input area and ignore user input made through the ineffective input area or other input related to the user input. For example, when the time during which the user input is maintained included within the second designated time range, the touch controller 320 may determine the user input to be, for example, touch input due to being held. Because the designated area is determined to be an ineffective input area, user input due to being held may be ignored.

In an embodiment, although not shown, when at least two user inputs input in at least two designated areas are acquired, the touch controller 320 may check the time during which the at least two user inputs are maintained in the at least two designated areas, and determine whether the time during which the at least two user inputs are maintained included within a first designated time range or a second designated time range. When the time during which the at least two user inputs are maintained included within the first designated time range, the touch controller 320 may determine the at least two designated areas to be effective input areas and transmit data on the two user inputs (e.g., double touch) to the processor. When the time during which the at least two user inputs are maintained included within the second designated time range, the touch controller 320 may determine the ineffective input area for the at least two designated areas, and ignore at least two user inputs (e.g., grip) input through the ineffective input area or other inputs related to the at least two user inputs.

Figure 14:
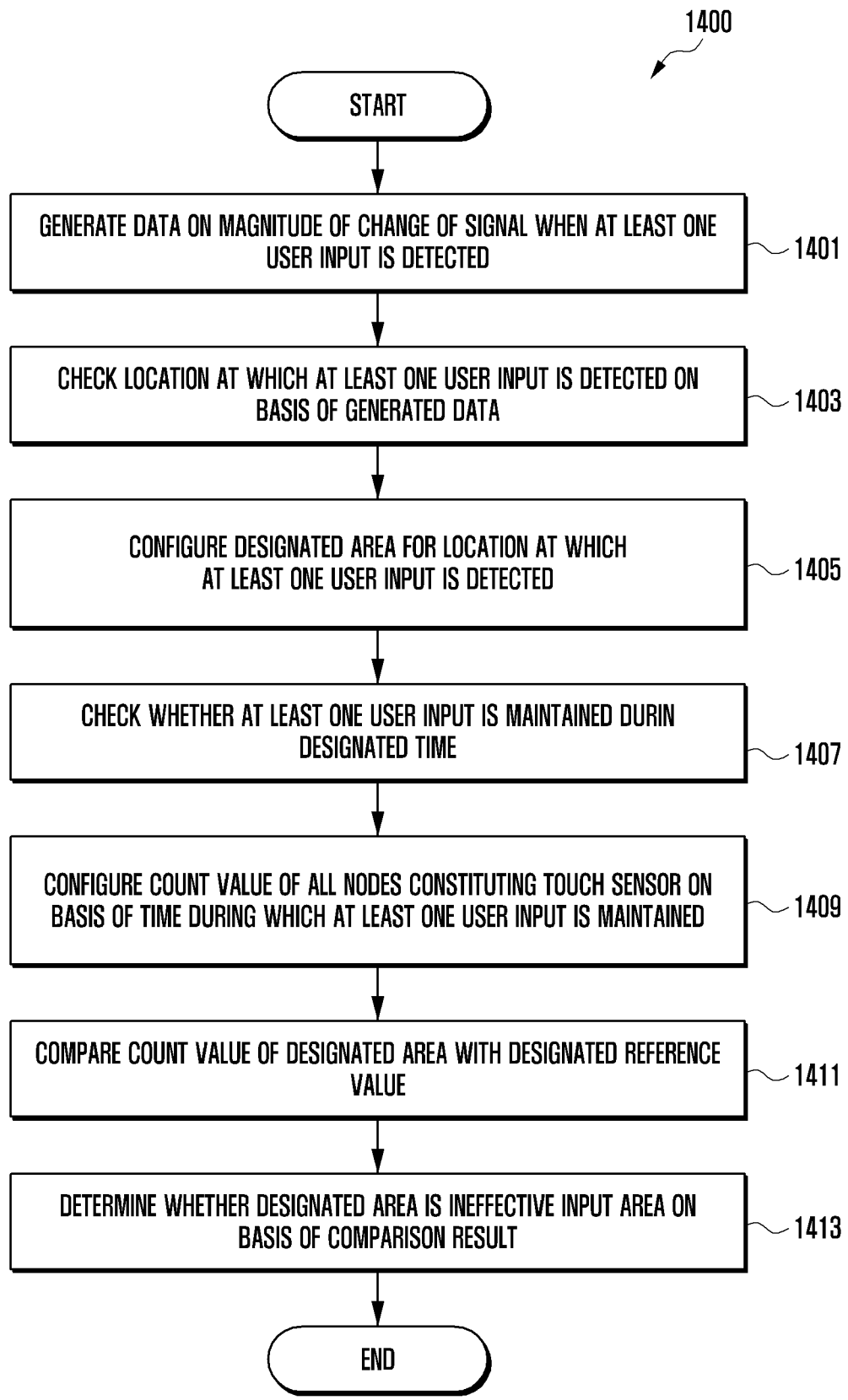
FIG. 14 is a flowchart illustrating a method of processing at least one user input detected on a display panel, according to various embodiments.

FIG. 14 is a flowchart 1400 illustrating a method of processing at least one user input detected on a display panel according to various embodiments.

In an embodiment, since operations 1401 to 1405 of FIG. 14 are the same as operations 701 to 705 of FIG. 7 described above, a description thereof will be replaced with a description related to FIG. 7. Hereinafter, in the description of FIG. 14, only configurations different from those of FIG. 7 will be described.

Referring to FIG. 14, in operation 1407, a touch controller (e.g., the touch controller 320 of FIG. 3) may check whether at least one user input is maintained for a designated time.

In an embodiment, in operation 1409, the touch controller 320 may configure a count value of all nodes constituting the touch sensor (e.g., the touch sensor 310 of FIG. 3), based on the time during which the at least one user input is maintained. For example, the touch controller 320 may apply different weight values to count values of all nodes constituting the touch sensor, based on whether the time during which the at least one user input is maintained included within, for example, a first designated time range or a second designated time range.

In an embodiment, after configuring the count values of all nodes constituting the touch sensor, the touch controller 320 may compare the count values set in respective nodes constituting the touch sensor with a designated reference value in operation 1411. In operation 1413, the touch controller 320 may determine whether the designated area is an ineffective input area based on the comparison result. For example, the touch controller 320 may determine an area including at least one node having a count value equal to or greater than a designated value among all nodes to be an ineffective input area, and may determine an area including at least one node having a count value less than the designated value to be an effective input area.

In an embodiment, the above-described operations of FIGS. 6 to 14 have been described as being performed by the touch controller 320, but are not limited thereto, and may be performed by an application processor (AP), a communication processor (CP), a sensor hub processor, a DDI 330, or a processor 360 including at least one of touch screen panel circuits.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a display panel including a touch sensor; and
    a processor,
    wherein the processor is configured to:
        acquire a user input made in a designated area of the display panel through the touch sensor;
        identify a pattern corresponding to a form of the user input;
        perform a designated operation based on the user input when the pattern corresponds to a first designated condition;
        check a time during which the user input is maintained with respect to the designated area when the pattern corresponds to a second designated condition, determine the designated area to be an ineffective input area, based at least on checking whether the time corresponds to a designated time range, and ignore user input made through the ineffective input area or another input related to the user input;

configure a count value of each of all nodes constituting the touch sensor, wherein the count value of each node of all nodes includes a value to which different weights are applied, based on at least one parameter;

compare a count value of each node to which a weight is applied with a designated reference value; and determine an area including at least one node having a count value exceeding the designated reference value among all nodes constituting the touch sensor to be the ineffective input area, based on the comparison result.

2. The electronic device of claim 1, further comprising a display-driving circuit, wherein the processor is configured to acquire the user input while the display-driving circuit displays a graphic object designating a low-power state.

3. The electronic device of claim 1, wherein the processor is configured to:

determine a central node, based on a position at which the user input is detected, among all nodes constituting the touch sensor; and configure an area including the determined central node and at least one peripheral node adjacent to the central node as the designated area.

4. The electronic device of claim 1, wherein the at least one parameter includes at least one of whether a corresponding node included within the designated area and whether the time during which the user input is maintained exceeds the designated time range.

5. The electronic device of claim 1, wherein the processor is configured to determine an area including at least one node having a count value equal to or less than the designated reference value among all nodes constituting the touch sensor to be an effective input area, based on the comparison result.

6. The electronic device of claim 5, wherein the processor is configured to perform a designated operation, based on a new user input made through the effective input area when the new user input is made through the effective input area while the designated area is determined to be the ineffective input area.

7. The electronic device of claim 1, wherein the processor is configured to:

identify a degree of proximity between at least two designated areas when at least two user inputs made in the at least two designated areas are obtained;

configure an ineffective input candidate area including the at least two designated areas when the at least two designated areas are within a first designated range from each other; and configure a plurality of ineffective input candidate areas including an ineffective input candidate area for each of the at least two designated areas and an ineffective input candidate area for another area intersecting each of the at least two designated areas when the at least two designated areas are separated by a second designated range.

8. The electronic device of claim 7, wherein the processor is configured to determine the ineffective input candidate area to be the ineffective input area based at least on identification that the pattern corresponding to the at least two user inputs corresponds to the second designated condition and the time during which the at least two user inputs are maintained corresponds to the designated time range.

9. The electronic device of claim 7, wherein the processor is configured to apply a different weight value to at least one of a count value for at least one node in the two designated areas included in the ineffective input candidate area, a count value for at least one node in an area other than the two designated areas, a count value for at least one node in which a noise phenomenon occurs in the ineffective input candidate area, or a count value for at least one node in an area other than the ineffective input candidate area according to the identified degree of proximity.

10. An electronic device comprising:

a display panel including a touch sensor; and a processor, wherein the processor is configured to:

acquire a user input made in a designated area of the display panel through the touch sensor;

check a time during which the user input in the designated area is maintained;

determine the designated area to be an effective input area, and perform a designated operation based on the user input made through the effective input area, when the time is included within a first designated time range;

determine the designated area to be an ineffective input area, and ignore the user input made through the ineffective input area or other input related to the user input, when the time is included within a second designated time range;

configure a count value of each of all nodes constituting the touch sensor, wherein the count value of each of all nodes is a value to which a different weight is applied based on the time during which the user input is maintained in the designated area;

compare a count value of each node to which a weight is applied with a designated reference value; and determine an area including at least one node having a count value exceeding the designated reference value among all nodes constituting the touch sensor to be the ineffective input area, based on the comparison result.

11. The electronic device of claim 10, wherein the processor is configured to:

determine a central node based on a position at which the user input is detected among all nodes constituting the touch sensor; and configure an area including the determined central node and at least one peripheral node adjacent to the central node as the designated area.

12. The electronic device of claim 10, wherein the processor is configured to:

check a time during which at least two user inputs in at least two designated areas are maintained when the at least two user inputs made in at least two designated areas are obtained;

determine the at least two designated areas as effective input areas when the time during which the at least two user inputs are maintained is included within the first designated time range; and determine the at least two designated areas to be the ineffective input area when the time during which the at least two user inputs are maintained is included within the second designated time range.

13. A method for processing a user input of an electronic device, the method comprising:

acquiring a user input made in a designated area of a display panel through a touch sensor;

identifying a pattern corresponding to a form of the user input;

performing a designated operation based on the user input when the pattern corresponds to a designated condition; and if the pattern corresponds to a second designated condition, checking a time during which the user input in the designated area is maintained, determining the designated area to be an ineffective input area based at least on confirmation that the time corresponds to a designated time range, and ignoring the user input made through the ineffective input area or other input related to the user input, wherein the determining the designated area to be the ineffective input area comprises:

configuring a count value of each of all nodes constituting the touch sensor, wherein the count value of each of all nodes includes a value to which different weights are applied, based on at least one parameter;

comparing a count value of each node to which a weight is applied with a designated reference value; and determining an area including at least one node having a count value exceeding the designated reference value among all nodes constituting the touch sensor to be the ineffective input area, based on the comparison result.

14. A method for processing a user input of an electronic device, the method comprising:

acquiring a user input made in a designated area of a display panel through a touch sensor;

checking a time during which the user input in the designated area is maintained;

determining the designated area to be an effective input area and performing a designated operation based on the user input made through the effective input area when the time is included within a first designated time range; and determining the designated area to be an ineffective input area, and ignoring the user input made through the ineffective input area or other input related to the user input, when the time is included within a second designated time range, wherein the determining the designated area to be the ineffective input area comprises:

configuring a count value of each of all nodes constituting the touch sensor, wherein the count value of each of all nodes is a value to which a different weight is applied based on the time during which the user input is maintained in the designated area;

comparing a count value of each node to which a weight is applied with a designated reference value; and determining an area including at least one node having a count value exceeding the designated reference value among all nodes constituting the touch sensor to be the ineffective input area, based on the comparison result.

* * * * *